United States Patent
Youn et al.

(10) Patent No.: US 12,457,523 B2
(45) Date of Patent: Oct. 28, 2025

(54) TRAFFIC CONTROL

(71) Applicant: LG ELECTRONICS INC., Seoul (KR)

(72) Inventors: Myungjune Youn, Seoul (KR); Laeyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 378 days.

(21) Appl. No.: 18/022,729

(22) PCT Filed: Aug. 31, 2021

(86) PCT No.: PCT/KR2021/011689
§ 371 (c)(1),
(2) Date: Feb. 22, 2023

(87) PCT Pub. No.: WO2022/050659
PCT Pub. Date: Mar. 10, 2022

(65) Prior Publication Data
US 2023/0319634 A1  Oct. 5, 2023

(30) Foreign Application Priority Data
Sep. 1, 2020  (KR) .......................... 10-2020-0111176

(51) Int. Cl.
*H04W 28/08* (2023.01)
*H04W 8/22* (2009.01)
(52) U.S. Cl.
CPC ......... *H04W 28/0846* (2020.05); *H04W 8/22* (2013.01)

(58) Field of Classification Search
None
See application file for complete search history.

(56) References Cited

U.S. PATENT DOCUMENTS

| | | | |
|---|---|---|---|
| 2019/0357294 A1* | 11/2019 | Ha | H04W 76/15 |
| 2020/0229035 A1* | 7/2020 | Kim | H04W 8/08 |
| 2021/0014734 A1* | 1/2021 | Liu | H04W 28/0942 |
| 2021/0022203 A1* | 1/2021 | Kang | H04W 8/08 |
| 2021/0289403 A1* | 9/2021 | Suh | H04W 36/125 |
| 2021/0409301 A1* | 12/2021 | Salkintzis | H04L 43/50 |

(Continued)

FOREIGN PATENT DOCUMENTS

KR  10-2019-0132931 A  11/2019

OTHER PUBLICATIONS

"3rd Generation Partnership Project; Technical Specification Group Services and System Aspects; System architecture for the 5G System (5GS); Stage 2 (Release 16)", 3GPP TS 23.501 V16.5.1 (Aug. 2020), Aug. 3, 2020, see sections 5.32.2, 5.32.6.1 and 5.32.8.

(Continued)

*Primary Examiner* — Eunsook Choi
(74) *Attorney, Agent, or Firm* — BRYAN CAVE LEIGHTON PAISNER LLP

(57) ABSTRACT

Provided in one embodiment of the present specification is a method by which a UE performs communication related to traffic control. The method may comprise steps in which: the UE transmits, to an SMF node, capability information related to supporting validity criteria for ATSSS rules; the UE receives one or more ATSSS rules from the SMF node; and the UE applies the one or more ATSSS rules.

11 Claims, 14 Drawing Sheets

(56) References Cited

U.S. PATENT DOCUMENTS

| | | | | |
|---|---|---|---|---|
| 2022/0116327 A1* | 4/2022 | Salkintzis | ......... | H04W 28/0215 |
| 2022/0264370 A1* | 8/2022 | Qiao | ................ | H04W 28/0967 |
| 2022/0330080 A1* | 10/2022 | Lu | ..................... | H04W 28/0252 |
| 2023/0189368 A1* | 6/2023 | Zhou | ................ | H04W 28/0865 |
| | | | | 370/328 |

OTHER PUBLICATIONS

Charter Communications, "Ki #1, New Sol: steering mode with location attribute", S2-2005286r1, 3GPP TSG-WG SA2 Meeting #140E e-meeting, Elbonia, Aug. 19-Sep. 1, 2020, see sections 6.Y.2 and 6.Y.4.

"3rd Generation Partnership Project; Technical Specification Group Services and System Aspects; Procedures for the 5G System (5GS); Stage 2 (Release 16)", 3GPP TS 23.502 V16.5.1 (Aug. 2020), Aug. 6, 2020, see sections 4.22-4.22.2.1.

Yoohwa Kang et al., "Multipath transmission control protocol-based multi-access traffic steering solution for 5G multimedia-centric network: Design and testbed system implementation", vol. 16, Issue 2, Feb. 27, 2020 [Retrieved on: Nov. 15, 2021], Retrieved from <URL: https://journals.sagepub.com/doi/pdf/10.1177/1550147720909759>, see pp. 3-10.

* cited by examiner

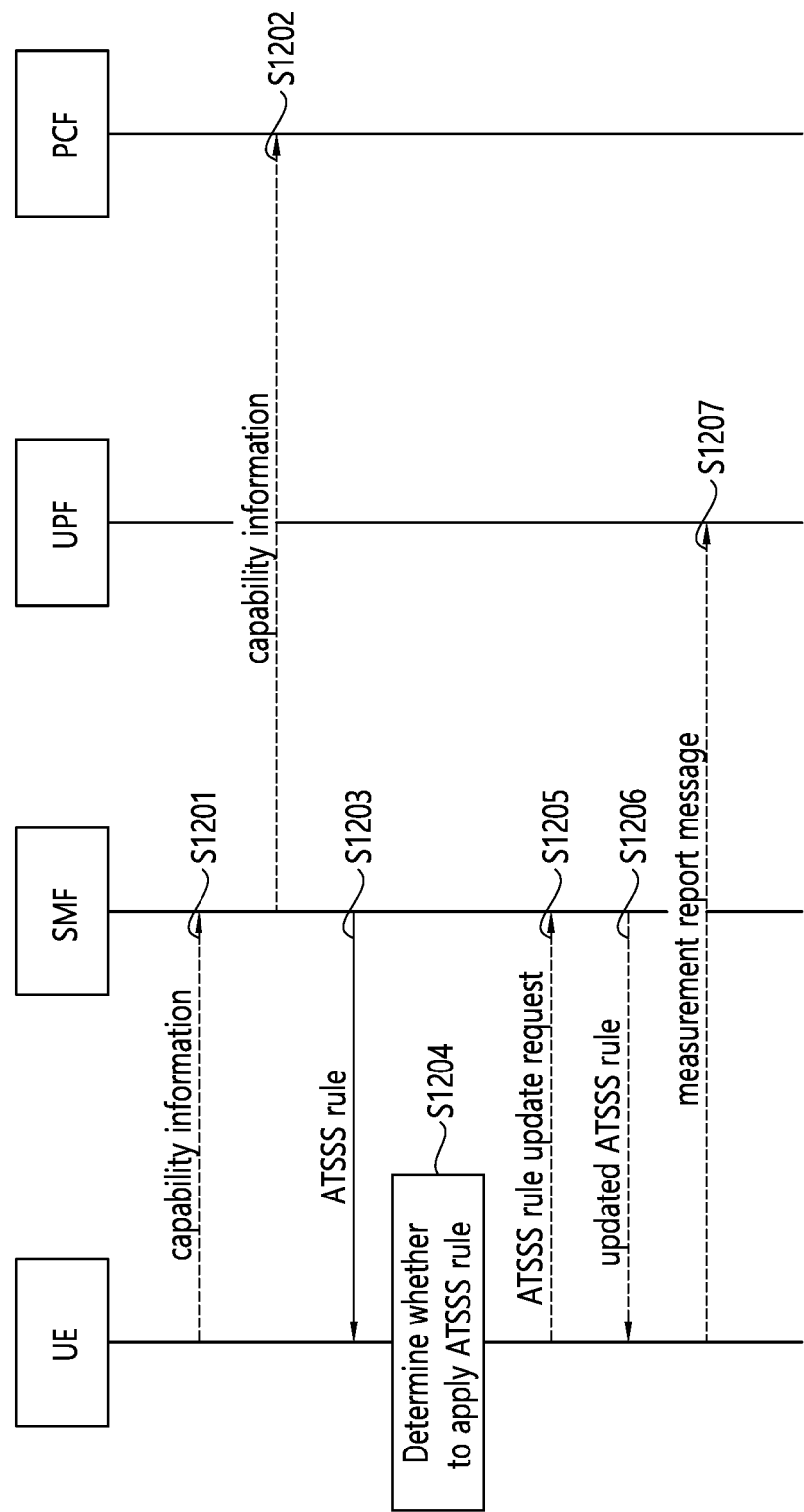

TRAFFIC CONTROL

CROSS REFERENCE TO RELATED APPLICATIONS

This application is the National Stage filing under 35 U.S.C. 371 of International Application No. PCT/KR2021/011689, filed on Aug. 31, 2021, which claims the benefit of Korean Patent Application No. 10-2020-0111176 filed on Sep. 1, 2020, which is hereby incorporated by reference herein in its entirety.

TECHNICAL FIELD

The present specification relates to mobile communications.

BACKGROUND

3rd generation partnership project (3GPP) long-term evolution (LTE) is a technology that enables high-speed packet communications. Many initiatives have been proposed for LTE goals, including those aimed at reducing user and provider costs, improving service quality, and expanding and improving coverage and system capacity. 3GPP LTE requires lower cost per bit, improved service availability, flexible use of frequency bands, simple structure, open interface, and proper power consumption of the terminal as upper-level requirements.

Work has begun at the International Telecommunication Union (ITU) and 3GPP to develop requirements and specifications for New Radio (NR) systems. 3GPP must identify and develop the technology components needed to successfully standardize a new Radio Access Technology (RAT) satisfying both urgent market needs and the long-term requirements determined in the ITU-R (International Mobile Telecommunications) international mobile telecommunications (IMT)-2020 process. In addition, NR must be able to use a spectral band in the range of at least 100 GHz that can be used for wireless communications even further into the future.

NR aims to be a single technology framework that covers all usage scenarios, requirements and deployment scenarios, including enhanced mobile broadband (eMBB), massive machine-type-communications (mMTC), ultra-reliable and low latency communications (URLLC), and more. NR may be essentially forward compatible.

Meanwhile, the Access Traffic Steering, Switching & Splitting (ATSSS) function was introduced in 5G. A UE and network may transmit traffic based on ATSSS rules. A method of introducing a validity criterion for ATSSS rules is being discussed. For example, whether the ATSSS rule is valid may vary according to criteria such as the location of the UE.

However, a specific method of applying the validity criterion of the ATSSS rule has not been discussed in the related art. For example, when the UE does not have a valid ATSSS rule, how the UE or the network handles traffic is not discussed at all. Also, whether UPFs apply validity criteria and how UPFs apply validity criteria are not discussed at all.

SUMMARY

Accordingly, a disclosure of the present specification has been made in an effort to solve the aforementioned problem.

In order to solve the above problems, one disclosure of the present specification provides a method for a UE to perform communication related to traffic control. The above method may include: transmitting capability information related to that the UE supports a validity criterion for an ATSSS rule to an SMF node; receiving one or more ATSSS rules from the SMF node; and applying the one or more ATSSS rules.

In order to solve the above problems, one disclosure of the present specification provides a UE performing communication related to traffic control. The UE includes at least one processor; and at least one memory that stores instructions and is operatively electrically connectable with the at least one processor, wherein operations performed based on execution of the instructions by the at least one processor may include: transmitting capability information related to that the UE supports a validity criterion for an ATSSS rule to an SMF node; receiving one or more ATSSS rules from the SMF node; and applying the one or more ATSSS rules.

In order to solve the above problems, one disclosure of the present specification provides a device in mobile communication. The device includes at least one processor; and at least one memory that stores instructions and is operatively electrically connectable with the at least one processor, wherein operations performed based on execution of the instructions by the at least one processor include: generating capability information related to that the UE supports a validity criterion for an ATSSS rule to an SMF node; obtaining one or more ATSSS rules from the SMF node; and applying the one or more ATSSS rules.

In order to solve the above problems, one disclosure of the present specification provides a non-transitory computer readable storage medium recording instructions. The instructions, when executed by one or more processors, cause the one or more processors to perform operations including: generating capability information related to that the UE supports a validity criterion for an ATSSS rule to an SMF node; obtaining one or more ATSSS rules from the SMF node; and applying the one or more ATSSS rules.

In order to solve the above problems, one disclosure of the present specification provides a method for an SMF node to perform communication related to traffic control. The method may include: receiving capability information from a UE related to that the UE supports a validity criterion for an ATSSS rule; and transmitting one or more ATSSS rules to the UE.

In order to solve the above problems, one disclosure of the present specification provides an SMF node that performs communication related to traffic control. The UE includes at least one processor; and at least one memory that stores instructions and is operably electrically connectable with the at least one processor, wherein operations performed based on execution of the instructions by the at least one processor comprising: receiving capability information related to supporting validity criterion for an ATSSS rule from the UE; and transmitting one or more ATSSS rules to the UE.

According to the disclosure of the present specification, it is possible to solve the problems of the prior art.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

FIG. 12 shows an example of an operation of a UE and an operation of a network according to the disclosure of the present specification.

DESCRIPTION OF EXEMPLARY EMBODIMENTS

Figure 1:
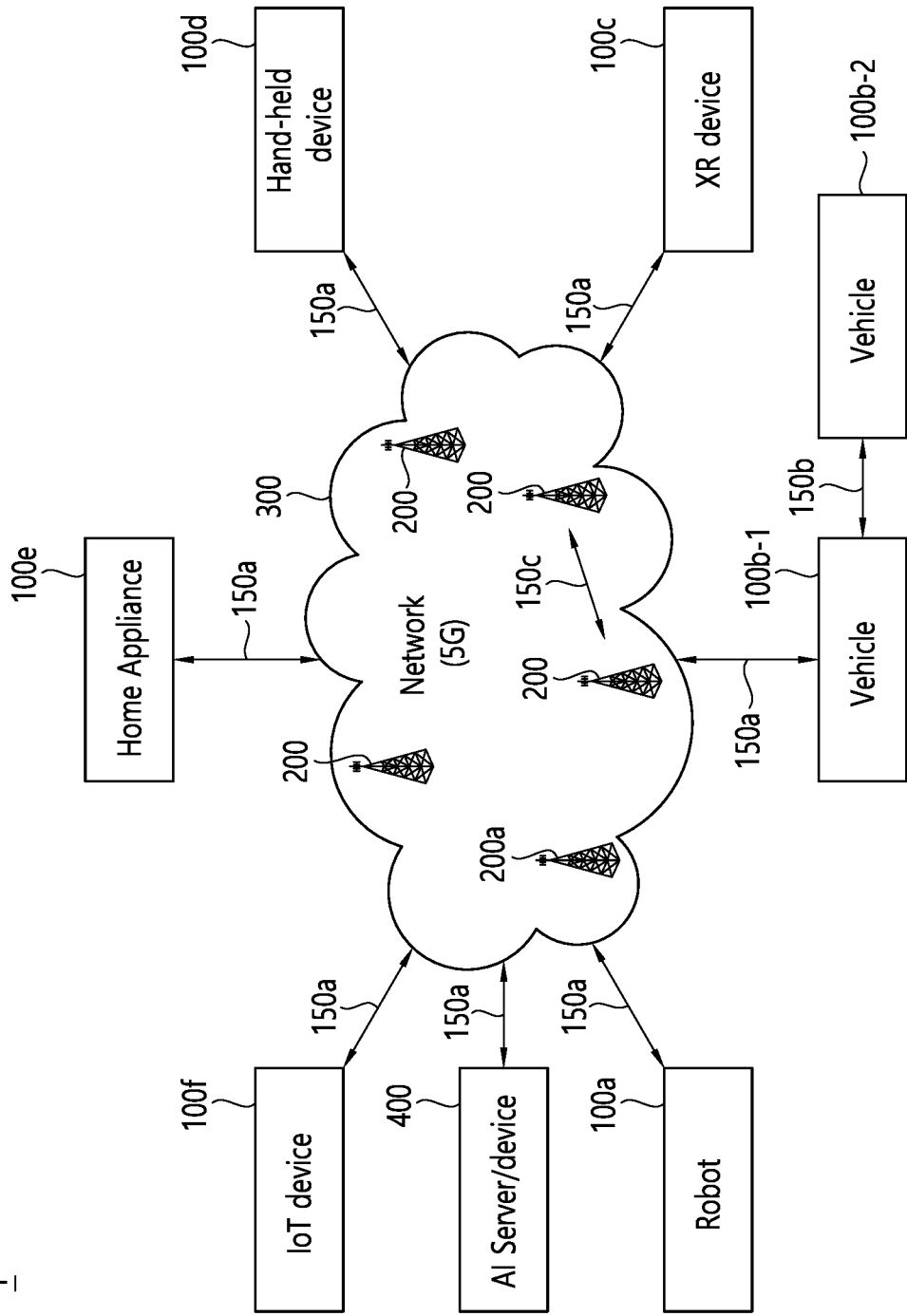
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

In the attached drawings, user equipments (UEs) are shown for example. The UE may also be denoted a terminal or mobile equipment (ME). In addition, the UE may be a laptop computer, a mobile phone, a PDA, a smartphone, a multimedia device, or other portable device, or may be a stationary device such as a PC or a car mounted device.

Hereinafter, the UE is used as an example of a wireless communication device (or a wireless apparatus, or a wireless device) capable of wireless communication. An operation performed by the UE may be performed by a wireless communication device. A wireless communication device may also be referred to as a wireless apparatus, a wireless device, or the like. Hereinafter, AMF may mean an AMF node, SMF may mean an SMF node, and UPF may mean a UPF node.

The term "base station" used hereinafter generally refers to a fixed station that communicates with a wireless device and may be denoted by other terms such as evolved-NodeB (eNodeB), evolved-NodeB (eNB), Base Transceiver System (BTS), access point, or Next generation NodeB (gNB).

I. Techniques and Procedures Applicable to the Disclosure of the Present Specification FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHZ | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally, and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names Additionally, and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
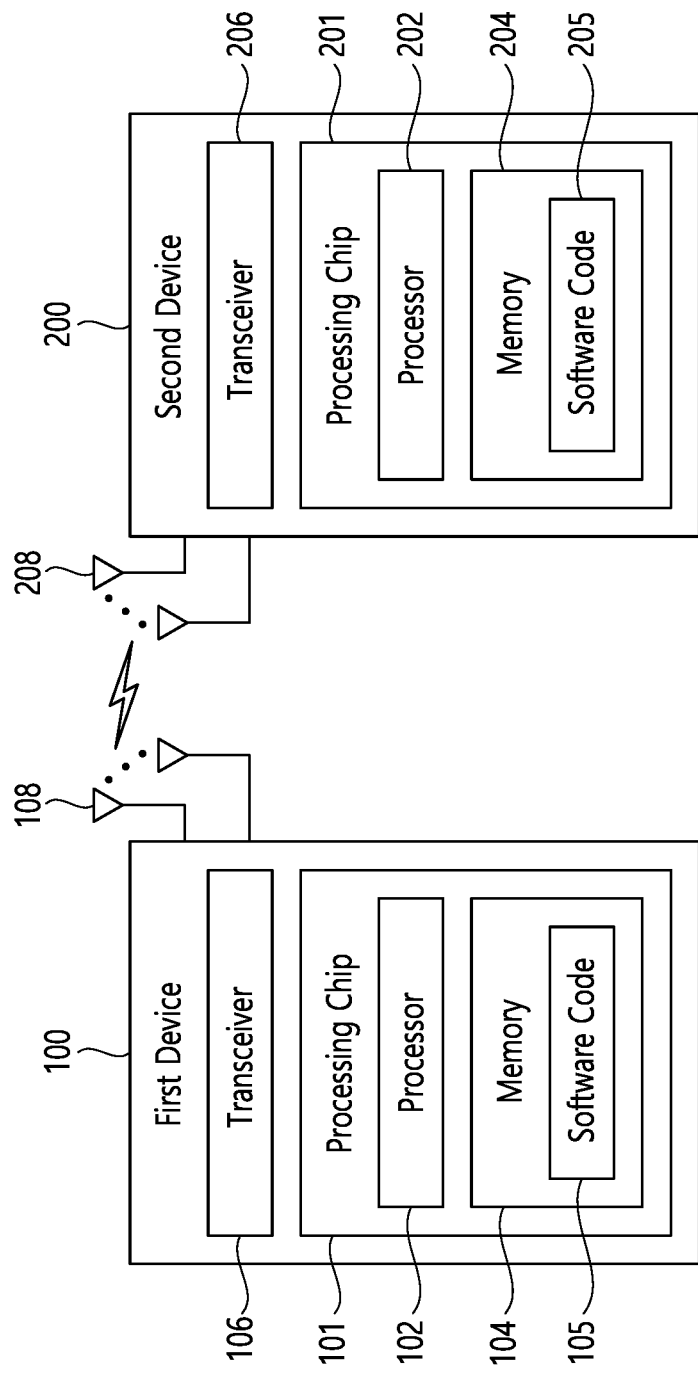
FIG. 2 shows an example of a wireless device to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
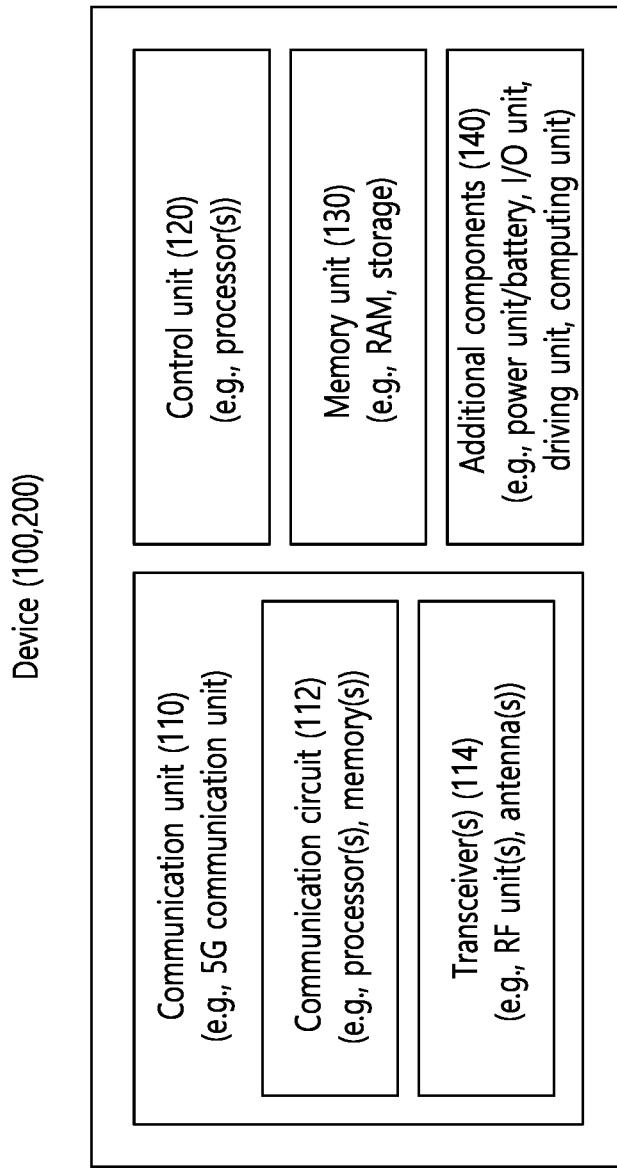
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/ portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
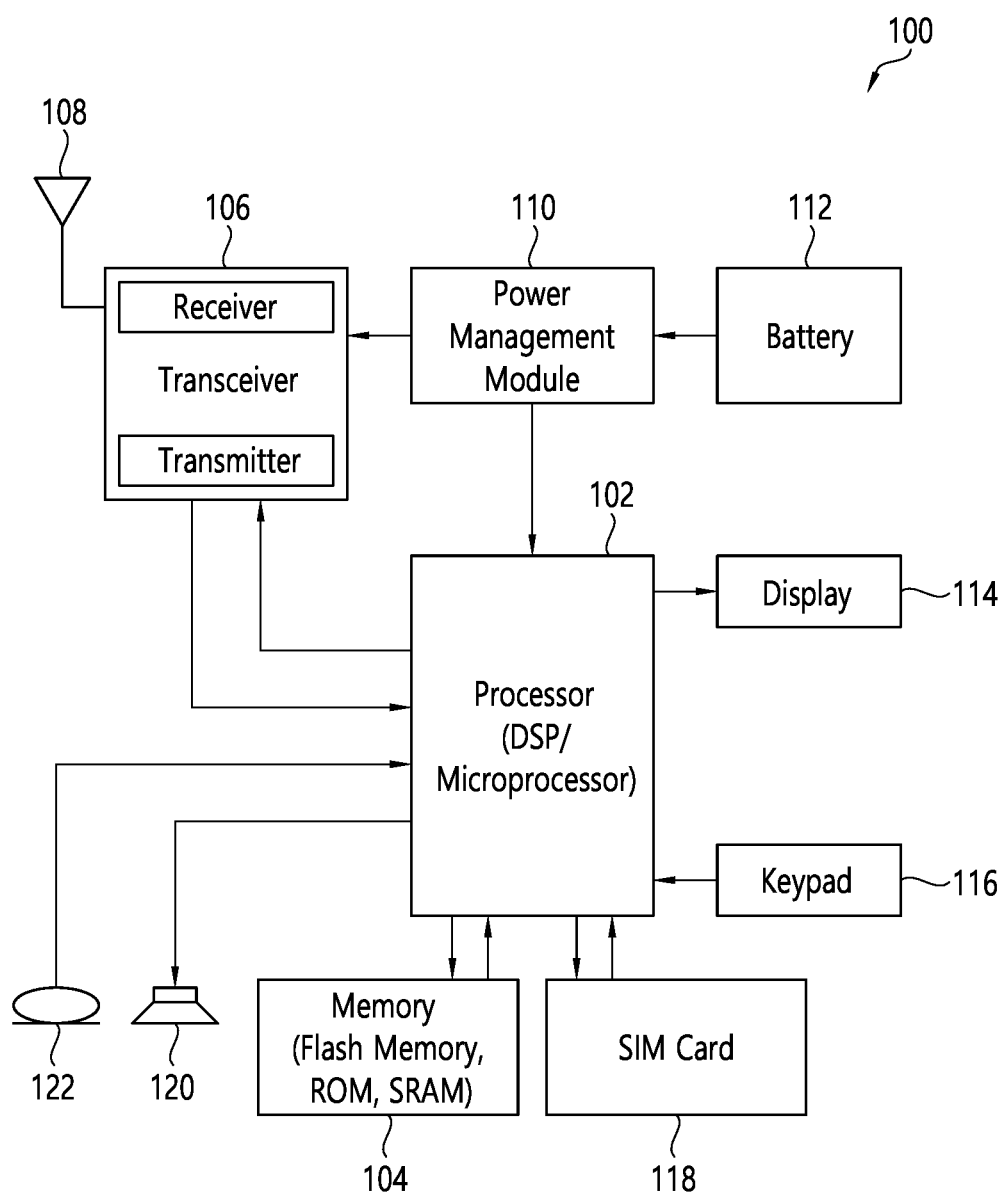
FIG. 4 shows an example of a UE to which the implementation of the present specification is applied.

FIG. 4 shows an example of a UE to which the implementation of the present specification is applied.

Referring to FIG. 4, a UE 100 may correspond to the first wireless device 100 of FIG. 2 and/or the wireless device 100 or 200 of FIG. 3.

The UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

Processor 102 may be configured to implement the descriptions, functions, procedures, suggestions, methods and/or operational flow diagrams disclosed herein. Processor 102 may be configured to control one or more other components of UE 100 to implement the descriptions, functions, procedures, proposals, methods and/or operational flow diagrams disclosed herein. Layers of radio interface protocols may be implemented in processor 102. Processor 102 may include an ASIC, other chipset, logic circuit, and/or data processing device. Processor 102 may be an application processor. The processor 102 may include at least one of a digital signal processor (DSP), a central processing unit (CPU), a graphics processing unit (GPU), and a modem (modulator and demodulator). An example of processor 102 can be found in SNAPDRAGON™ series processors made by Qualcomm®, EXYNOS™ series processors made by Samsung®, A series processors made by Apple®, HELIO™ series processors made by MediaTek®, ATOM™ series processors made by Intel® or the corresponding next-generation processor.

Memory 104 is operatively coupled to processor 102 and stores various information for operating processor 102. Memory 104 may include ROM, RAM, flash memory, memory cards, storage media, and/or other storage devices. When an implementation is implemented in software, the techniques described herein may be implemented using modules (e.g., procedures, functions, etc.) that perform the descriptions, functions, procedures, proposals, methods, and/or operational flow diagrams disclosed herein. A module may be stored in memory 104 and executed by processor 102. Memory 104 may be implemented within processor 102 or external to processor 102, in this case, it may be communicatively coupled with the processor 102 through various methods known in the art.

A transceiver 106 is operatively coupled to the processor 102 and transmits and/or receives wireless signals. The transceiver 106 includes a transmitter and a receiver. The transceiver 106 may include baseband circuitry for processing radio frequency signals. The transceiver 106 controls one or more antennas 108 to transmit and/or receive radio signals.

Power management module 110 manages power to processor 102 and/or transceiver 106. The battery 112 supplies power to the power management module 110.

Display 114 outputs the result processed by processor 102. Keypad 116 receives input for use by processor 102. Keypad 116 may be displayed on display 114.

The SIM card 118 is an integrated circuit for securely storing international mobile subscriber identity (IMSI) and related keys, it is used to identify and authenticate subscribers in mobile phone devices such as cell phones and computers. Also, contact information may be stored on many SIM cards.

The speaker 120 outputs sound related results processed by the processor 102. Microphone 122 receives sound-related input for use by processor 102.

Figure 5:
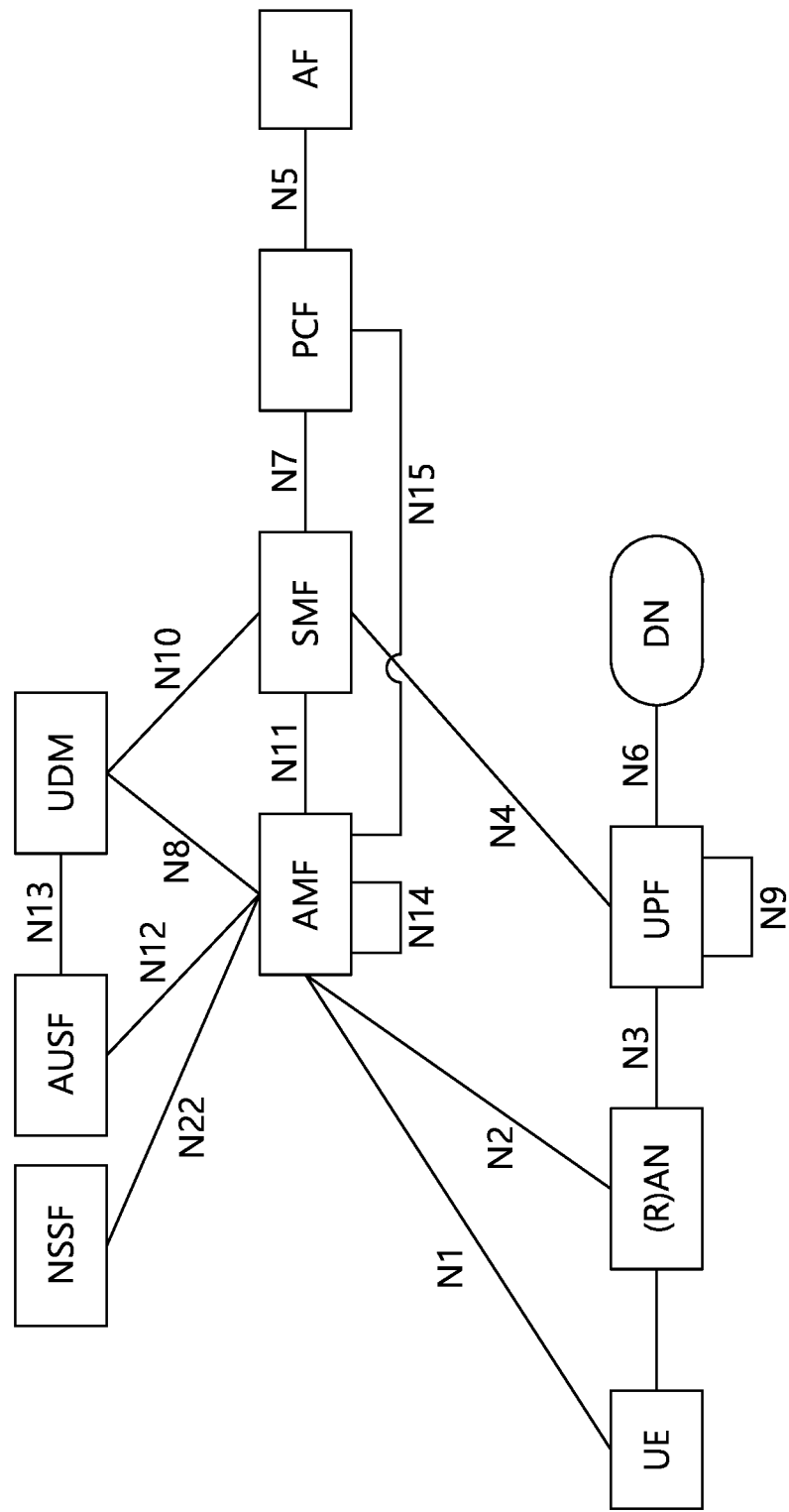
FIG. 5 shows an example of 5G system architecture to which implementations of the present disclosure is applied.

FIG. 5 shows an example of 5G system architecture to which implementations of the present disclosure is applied.

The 5G system (5GS) architecture consists of the following network functions (NF).
  Authentication Server Function (AUSF)
  Access and Mobility Management Function (AMF)
  Data Network (DN), e.g., operator services, Internet access or 3rd party services
  Unstructured Data Storage Function (UDSF)
  Network Exposure Function (NEF)
  Intermediate NEF (I-NEF)
  Network Repository Function (NRF)
  Network Slice Selection Function (NSSF)
  Policy Control Function (PCF)
  Session Management Function (SMF)
  Unified Data Management (UDM)
  Unified Data Repository (UDR)
  User Plane Function (UPF)
  UE radio Capability Management Function (UCMF)
  Application Function (AF)
  User Equipment (UE)
  (Radio) Access Network ((R)AN)
  5G-Equipment Identity Register (5G-EIR)
  Network Data Analytics Function (NWDAF)
  CHarging Function (CHF)
  Furthermore, the following network functions may be considered.
  Non-3GPP InterWorking Function (N3IWF)
  Trusted Non-3GPP Gateway Function (TNGF)
  Wireline Access Gateway Function (W-AGF)

FIG. 5 depicts the 5G system architecture in the non-roaming case, using the reference point representation showing how various network functions interact with each other.

In FIG. 5, for the sake of clarity of the point-to-point diagrams, the UDSF, NEF and NRF have not been depicted. However, all depicted Network Functions can interact with the UDSF, UDR, NEF and NRF as necessary.

For clarity, the UDR and its connections with other NFs, e.g., PCF, are not depicted in FIG. 5. For clarity, the NWDAF and its connections with other NFs, e.g., PCF, are not depicted in FIG. 5.

The 5G system architecture contains the following reference points:
  N1: Reference point between the UE and the AMF.
  N2: Reference point between the (R)AN and the AMF.
  N3: Reference point between the (R)AN and the UPF.
  N4: Reference point between the SMF and the UPF.
  N6: Reference point between the UPF and a Data Network.
  N9: Reference point between two UPFs.

The following reference points show the interactions that exist between the NF services in the NFs.
  N5: Reference point between the PCF and an AF.
  N7: Reference point between the SMF and the PCF.
  N8: Reference point between the UDM and the AMF.
  N10: Reference point between the UDM and the SMF.
  N11: Reference point between the AMF and the SMF.
  N12: Reference point between the AMF and the AUSF.
  N13: Reference point between the UDM and the AUSF.
  N14: Reference point between two AMFs.
  N15: represents a reference point between PCF and AMF, and a reference point between AMF and PCF of a visited network in a roaming scenario.
  N16: Reference point between two SMFs, (in roaming case between SMF in the visited network and the SMF in the home network).
  N22: Reference point between the AMF and the NSSF.
  N30: Reference point between PCF and NEF.
  N33: Reference point between AF and NEF.

In some cases, a couple of NFs may need to be associated with each other to serve a UE.

For reference, in FIG. 5, an AF by a third party other than an operator may be connected to 5GC through NEF.

Figure 6:
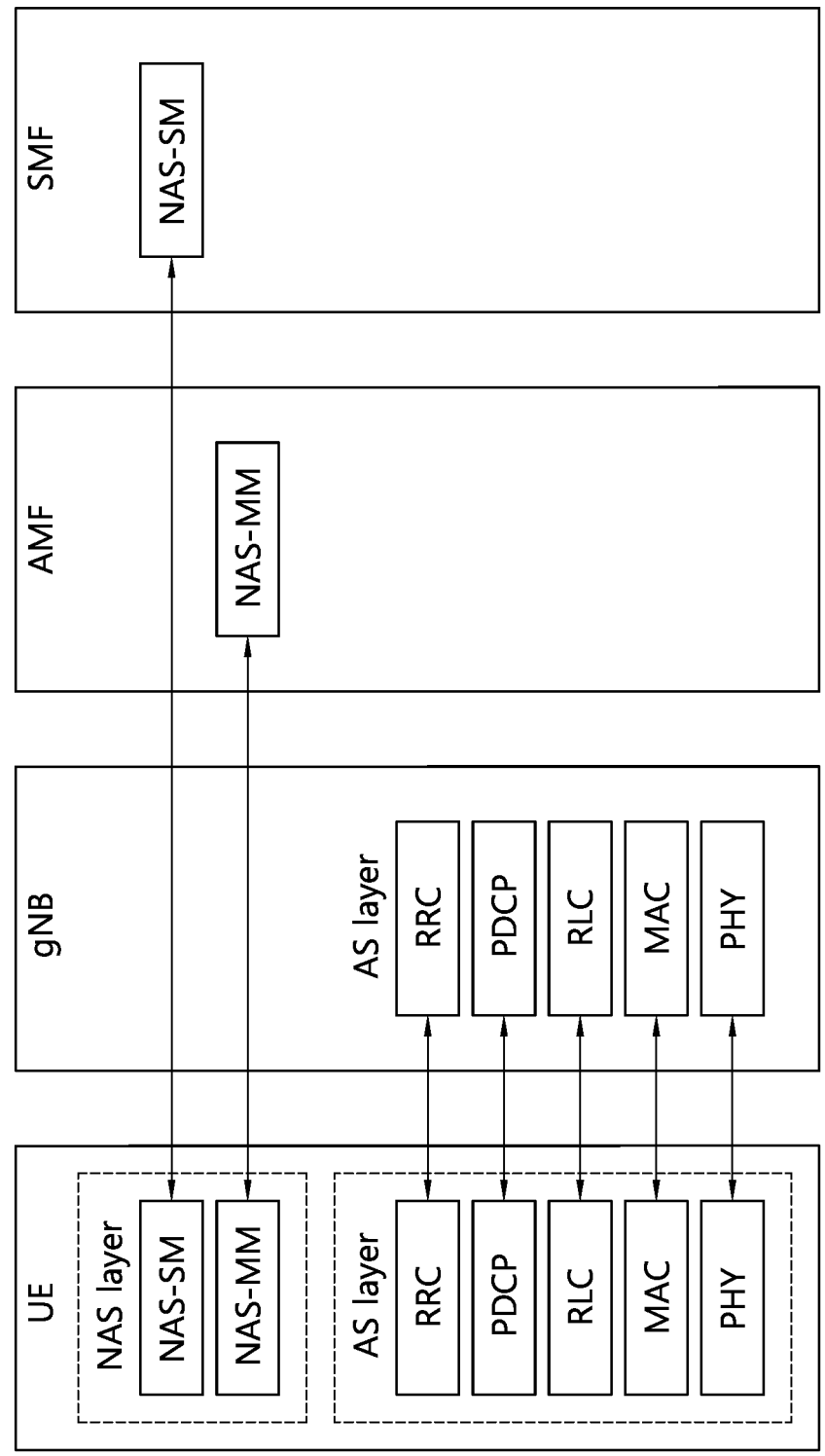
FIG. 6 is another exemplary diagram showing the structure of a radio interface protocol (Radio Interface Protocol) between the UE and the gNB.

FIG. 6 is another exemplary diagram showing a structure of a radio interface protocol between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the open system interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel In addition, data is transmitted between different physical layers, that is, between the physical layers of a transmitting side and a receiving side through a physical channel.

The second layer includes a medium access control (MAC) layer, a radio link control (RLC) layer, and a packet data convergence protocol (PDCP) layer.

The third layer includes radio resource control (hereinafter abbreviated as RRC). The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The NAS layer performs functions such as connection management (session management) and mobility management.

The NAS layer is divided into a NAS entity for mobility management (MM) and a NAS entity for session management (SM).

1) NAS entity for MM provides the following functions in general.
  NAS procedures related to AMF include the following.
  Registration management and access management procedures. AMF supports the following functions.
  Secure NAS signal connection between UE and AMF (integrity protection, encryption)

2) The NAS entity for SM performs session management between the UE and the SMF.

The SM signaling message is processed, that is, generated and processed, at an NAS-SM layer of the UE and SMF. The contents of the SM signaling message are not interpreted by the AMF.

In the case of SM signaling transmission,
  The NAS entity for the MM creates a NAS-MM message that derives how and where to deliver an SM signaling message through a security header representing the NAS transmission of SM signaling and additional information on a received NAS-MM.
  Upon receiving SM signaling, the NAS entity for the SM performs an integrity check of the NAS-MM message, analyzes additional information, and derives a method and place to derive the SM signaling message.

Meanwhile, in FIG. 6, the RRC layer, the RLC layer, the MAC layer, and the PHY layer located below the NAS layer are collectively referred to as an access stratum (AS).

A network system (i.e., 5GC) for next-generation mobile communication (i.e., 5G) also supports non-3GPP access. An example of the non-3GPP access is typically a WLAN access. The WLAN access may include both a trusted WLAN and an untrusted WLAN.

In the system for 5G, AMF performs registration management (RM: Registration Management) and connection management (CM: Connection Management) for 3GPP access as well as non-3GPP access.

A Multi-Access (MA) PDU session using both 3GPP access and non-3GPP access may be used.

The MA PDU session is a PDU session that can be serviced simultaneously with 3GPP access and non-3GPP access using one PDU session.

<Multi-Access (MA) PDU Session>

In the prior art, the MA PDU session is a session that can be serviced simultaneously with 3GPP access and non-3GPP access using one PDU session.

Figure 7:
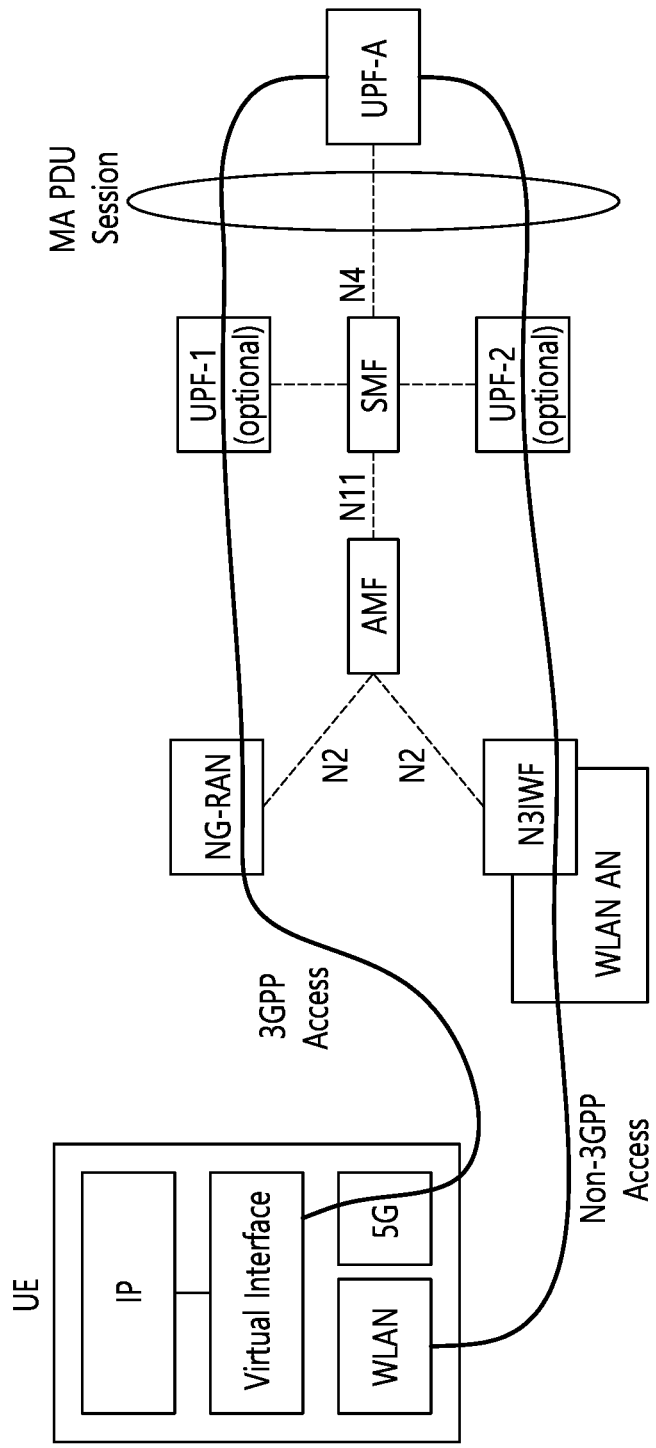
FIG. 7 shows an example in which an MA PDU session is generated.

FIG. 7 shows an example in which a MA PDU session is generated.

In FIG. 7, the MA PDU session is one PDU session and has a separate session tunnel for each access. One is established on 3GPP access, and the other PDU session is established on untrusted non-3GPP access (e.g., WLAN AN).

Since the MA PDU session is one session, the MA PDU session has the following characteristics.
  (i) one DNN;
  (ii) one UPF Anchor (UPF-A);
  (iii) one PDU type (e.g., IPv6);
  (iv) one session IP address
  (v) one SSC mode
  (vi) one HPLMN S-NSSAI.

The MA PDU session enables a multipath data link between the UE and UPF-A. This can be implemented below the IP layer.

A MA PDU session may be established through one of the following procedures.
  (i) It can be established through two separate PDU session establishment procedures. This is called individual establishment.
  (ii) It may be established through one MA PDU session establishment procedure. That is, the MA PDU session is simultaneously established in two accesses with one session establishment request. This is called binding establishment.

After the MA PDU session is established, Session Management (SM) signaling related to the MA PDU session may be transmitted and received through random access.

A. Individual Establishment of MA PDU Session

A MA PDU session may be established through two separate PDU session establishment procedures. For example, the UE may establish a MA PDU session on 3GPP access, and then perform a PDU session establishment procedure on non-3GPP access in order to add non-3GPP access to the MA PDU session created on 3GPP access. The request type in the establishment request message for adding the second access may be set to "MA PDU Request".

B. Binding establishment.

A MA PDU session may be simultaneously established for 3GPP access and non-3GPP access through one procedure. Such one procedure may be referred to as a MA PDU session establishment procedure by UE request. The above procedure may be useful when the UE intends to establish a MA PDU session while the UE is already registered with 5GC through two accesses. Instead of performing two separate PDU session establishment procedures, the UE may establish a MA PDU session by performing one MA PDU session establishment procedure.

Figure 8:
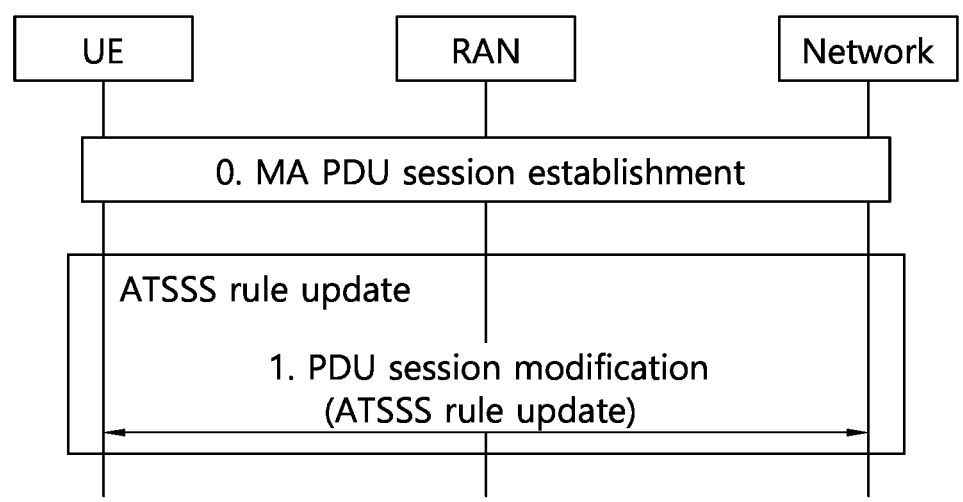
FIG. 8 shows an example of applying the ATSSS rule to the MA PDU session.

FIG. 8 shows an example of applying the ATSSS rule to the MA PDU session.

Referring to FIG. 8, if the SMF wants to move an IP flow transmitted to non-3GPP access to 3GPP access in a state in which a multi-access (MA) PDU session is established, through 3GPP access, updated ATSSS (Access Traffic Steering, Switching and Splitting) rules can be transmitted.

<Access Traffic Steering, Switching & Splitting(ATSSS)>

The ATSSS function may be an optional feature supported by the UE and the 5GC network.

The ATSSS function may enable a multi-access PDU Connectivity Service. For example, the ATSSS function may exchange PDUs between the UE and the data network by using one 3GPP access network and one non-3GPP access network simultaneously, and using two independent N3/N9 tunnels between the PSA and RAN/AN. The multi-access PDU connection service may be realized by establishing a Multi-Access PDU (MA PDU) Session. The MA PDU session may be, for example, a PDU session with user-plane resources in two access networks.

If the UE is registered through 3GPP and non-3GPP access, or if the UE is registered with only one access, the UE may request a MA PDU session.

After the MA PDU session is established, if user-plane resources exist in both access networks, in order to determine how to distribute uplink traffic through the two access networks, the UE applies network-provided policies (e.g., ATSSS rules) and exchange local conditions (e.g., network interface availability, signal loss conditions, user preferences, etc.). Similarly, the UPF anchor of the MA PDU session applies the network provision policy (e.g. N4 rule) and feedback information received from the UE through the user plane (e.g. access network unavailability or availability) to determine to distribute downlink traffic to two N3/N9 tunnel and to two access networks. If only one access network has a user plane resource, to trigger the establishment or activation of a user plane resource through the other access, the UE may apply the ATSSS rule, and may consider local conditions.

The MA PDU session type may be, for example, one of IPv4, IPv6, IPv4v6 and Ethernet. Unstructured types may not be supported in the current version.

ATSSS functionality can be supported over any type of access network. Here, all types of access networks may include untrusted non-3GPP access networks and trusted non-3GPP access networks, wireline 5G access networks, and the like. As long as the MA PDU session can be established over any type of access network, the ATSSS function can be supported over any type of access network.

Hereinafter, a function for enabling ATSSS will be described.

First, the MA PDU session will be described. MA PDU sessions can be managed using the session management function with the following additions and modifications:

1) If the UE wants to request a new MA PDU session:
  When the UE is registered in the same PLMN through 3GPP access and non-3GPP access, the UE may transmit a PDU session establishment request message including "MA PDU Request" through one of the two accesses. The AMF may inform the SMF that the UE is registered via both accesses. The AMF notifying the SMF may trigger establishment of user-plane resources in both accesses and two N3/N9 tunnels between the PDU session anchor (PSA) and the RAN/AN.

When the UE is registered with different PLMNs through 3GPP access and non-3GPP access, the UE may transmit a PDU session establishment request message including "MA PDU Request" through one of the two accesses. After this PDU session is established in one N3/N9 tunnel between the PSA and (R)AN/AN, the UE may transmit a PDU session establishment request message including "MA PDU Request" and the same PDU session ID via the other access. User-plane resources in both accesses and two N3/N9 tunnels between PSA and RAN/AN may be established.

If the UE is registered through only one access, the UE may transmit a PDU session establishment request message including an indication of "MA PDU Request" through the access in which the UE is registered. One N3/N9 tunnel between PSA and RAN/AN and user-plane resources in this access may be established. After the UE is registered through the second access, the UE may establish user-plane resources in the second access.

In the PDU session establishment request message transmitted to request a new MA PDU session, the UE may provide ATSSS capability information of the UE. ATSSS capability (capabilities) information may include information about the steering mode and steering functionalities supported by the UE.

If the UE indicates that it can support ATSSS-LL (Low Layer) function with any steering mode, and the network accepts to activate this function, the network may provide UE Measurement Assistance Information to the UE. And, the network may provide one or more ATSSS rules to the UE.

The UE indicates that the UE can support the MPTCP function in any steering mode, and can support the ATSSS-LL function only in the Active-Standby steering mode, and the network may accept to activate these functions. In this case, the network provides MPTCP proxy information to the UE, the network may allocate one IP address/prefix for the MA PDU session and two additional IP addresses/prefixes called "link-specific multipath" to the UE. Additionally, the network may provide the UE with UE measurement assistance information and provide the UE with one or more ATSSS rules, including ATSSS rules for non-MPTCP traffic. ATSSS rules for non-MPTCP traffic can use the ATSSS-LL function and Active-Standby steering mode to indicate how non-MPTCP traffic is transmitted over 3GPP access and non-3GPP access in the uplink direction.

If the UE indicates that it can support MPTCP functions with all steering modes and ATSSS-LL functions with all steering modes, and the network accepts to enable these functions, the network may provide MPTCP proxy information to the UE. In addition, the network may allocate one IP address/prefix for the MA PDU session and two additional IP addresses/prefix called "link-specific multipath" to the UE. The network may provide UE measurement assistance information and one or more ATSSS rules to the UE.

If the UE requests S-NSSAI, S-NSSAI shall be allowed in both accesses. Otherwise, the MA PDU session may not be established.

The SMF may determine ATSSS capabilities supported for the MA PDU session, based on ATSSS capabilities provided by the UE and the DNN configuration of the SMF. The SMF may perform the following actions:

a) if the UE includes "MPTCP functionality with any steering mode and ATSSS-LL functionality with only Active-Standby steering mode" in the ATSSS capability; and a-1) If the DNN configuration allows MPTCP and ATSSS-LL for all steering modes, for the MA PDU session, (1) MPTCP and ATSSS-LL may be possible for all steering modes in downlink, (2) uplink MPTCP and ATSSS-LL may be possible in Active-Standby mode; or a-2) If the DNN configuration allows MPTCP for all steering mode and allows ATSSS-LL for Active-Standby mode, for MA PDU session, MPTCP and ATSSS-LL are possible in Active-Standby mode in uplink and downlink.

b) If the UE includes "ATSSS-LL functionality with any steering mode" in the ATSSS capability, and the DNN settings allow ATSSS-LL with any steering mode, the MA PDU session will cover all steering modes in uplink and downlink. ATSSS-LL may be possible.

c) If the UE includes "MPTCP functionality with any steering mode and ATSSS-LL functionality with any steering mode" in the ATSSS capability, and the DNN configuration allow MPTCP and ATSSS-LL for all steering modes, for the MA PDU session, MPTCP and ATSSS-LL may be possible with all steering modes in uplink and downlink.

The SMF may provide the ATSSS capability of the MA PDU session to the PCF while the PDU session establishment procedure is being performed.

Policy and charging control (PCC) rules provided by the PCF may include ATSSS control information. The PCC rule and ATSSS control information may be used by the SMF to derive the ATSSS rule for the UE and the N4 rule for the UPF. For MA PDU session, if dynamic PCC rule is not used, SMF may provide ATSSS rule and N4 rule to UE and UPF, respectively, based on local configuration (e.g., local configuration based on DNN or S-NSSAI).

The UE may receive the ATSSS rule from the SMF. The ATSSS rule may indicate how to route uplink traffic through 3GPP access and non-3GPP access. Similarly, the UPF may receive the N4 rule from the SMF. The N4 rule may indicate how to route downlink traffic through 3GPP access and non-3GPP access.

When the SMF receives the PDU session establishment request message including the "MA PDU Request" indication, and if UP security protection is required for the PDU session, the SMF may confirm the establishment of the MA PDU session only if UP security protection requiring 3GPP access can be enforced. The SMF need not to check whether it can enforce UP security protections that require non-3GPP access.

2) After the MA PDU session establishment procedure (i.e., after the MA PDU session is established), the following description may be applied:

at any given time, a MA PDU session may have user-plane resources in both 3GPP access and non-3GPP access, may have user-plane resources in only one access, or may not have user-plane resources in any access.

Even if the UE deregisters from one access, AMF, SMF, PCF and UPF can maintain their MA PDU session contexts if the UE is registered with another access When the UE deregisters from one access and the UE is registered for another access, the AMF may inform the SMF that the access type for the MA PDU session has become unavailable. Thereafter, the SMF may inform the UPF that the access type of the deregistered access has become unavailable and that the N3/N9 tunnel for the corresponding access type has been released.

When the UE wants to add a user-plane resource in one access of the MA PDU session (e.g., based on access network performance measurement and/or ATSSS rules), the UE may transmit a PDU session establishment request message over this access. Here, the PDU session establishment request message may include a PDU session ID of the MA PDU session and an "MA PDU Request" indication. For this access, if N3/N9 do not exist, N3/N9 for this access may be established.

When the UE wants to re-activate a user-plane resource in one access of the MA PDU session (e.g., based on access network performance measurement and/or ATSSS rules), the UE may initiate a UE Triggered Service Request procedure through this access.

3) When the network wants to re-activate the user-plane resource through 3GPP access or non-3GPP access of the MA PDU session, the network may initiate a Network Triggered Service Request procedure.

A MA PDU session may also be established in one of the following cases:
a) when the establishment of the MA PDU session is explicitly requested by the ATSSS-capable UE; or
b) If the ATSSS-capable UE requests a single-access PDU session, but the network decides to establish the MA PDU session instead, the MA PDU session may be established. This example may correspond to an optional scenario, this example may occur when a UE that requires single access for a PDU session has requested a single-access PDU session, but when there are no a policy (e.g. UE route selection policy (URSP) rule) and local restrictions.

When the UE moves from EPS to 5GS, a MA PDU session may be established while the PDU session modification procedure is performed.

An ATSSS-capable UE may decide to request a MA PDU session based on the provided URSP rule. In particular, if the URSP rule triggers the UE to establish a new PDU session, and if the access type preference component of the URSP rule indicates "Multi-Access", the UE may request an MA PDU session when the UE applies the URSP rule.

Hereinafter, a policy for ATSSS control will be described.

While the establishment of the MA PDU session is being performed, if a dynamic PCC is used for the MA PDU session, the PCF may perform ATSSS policy determination and create a PCC rule including ATSSS policy control information. Here, the ATSS policy control information may be used to determine how uplink traffic and downlink traffic of the MA PDU session are distributed through 3GPP access and non-3GPP access.

The SMF may receive the PCC rule together with the ATSSS policy control information from the PCF. And, the SMF may map these rules to (a) the ATSSS rule transmitted to the UE and (b) the N4 rule transmitted to the UPF. The ATSSS rule may be a prioritized list of rules that the UE applies to enforce the ATSSS policy in the uplink direction. And, the N4 rule may be applied by the UPF to enforce the ATSSS policy in the downlink direction.

When a MA PDU session is created or the MA PDU session is updated by the SMF (for example, after the SMF receives an updated (or new) PCC rule from the PCF), the ATSSS rule may be transmitted to the UE along with the NAS message. Similarly, the N4 rule may be transmitted to the UPF when a MA PDU session is created or the MA PDU session is updated by the SMF.

For ATSSS, Quality of Service (QoS) may be supported. Hereinafter, QoS support (QoS support) will be described.

The 5G QoS model for single access PDU sessions can also be applied to MA PDU sessions. For example, the QoS flow may be the finest granularity of QoS differentiation in the MA PDU session. Compared to a single-access PDU session, one difference is that in the MA PDU session, there may be separate user plane tunnels between the AN and the PSA, and each user plane tunnel may be related to a specific access (either 3GPP access or non-3GPP access). However, QoS flows may not be associated with a particular access. That is, since QoS flows are access-agnostic, the same QoS can be supported when traffic is distributed through 3GPP access and non-3GPP access. SMF may provide the same QoS Flow ID (QFI) in 3GPP access and non-3GPP access, so that the same QoS is supported in both access.

Regarding ATSSS, Access Network Performance Measurements may be supported. Hereinafter, Access Network Performance Measurements will be described.

When the MA PDU session is established, the network may provide Measurement Assistance Information to the UE. The measurement support information can be used to determine which measurements the UE should perform in both accesses, the measurement assistance information may be used to determine whether the UE needs to send a measurement report to the network.

The measurement support information may include addressing information of a Performance Measurement Function (PMF) in UPF, and the UE may transmit a PMF protocol message in the manner shown in the following example:
In the case of an IP type PDU session, measurement support information may include one IP address for PMF, User Datagram Protocol (UDP) port related to 3GPP access, and another UDP port related to non-3GPP access;
In the case of an Ethernet type PDU session, measurement support information may include one MAC address related to 3GPP access and another MAC address related to non-3GPP access.
NOTE 1: To protect the PMF in UPF (e.g. Distributed Denial of Service (DDOS) blocking for PMF), IP address of PMF is accessible only from UE IP address through N3/N9 interface.
NOTE 2: After the MA PDU session is released, the same UE IP address/prefix for the MA PDU session may not be assigned to another UE within a short time.

PMF protocol messages such as the following examples may be exchanged between the UE and the PMF:
Messages can be exchanged allowing Round Trip Time (RTT) measurements. For example, if a "minimum delay" Steering Mode is used, messages allowing RTT measurements may be exchanged.
The UE may transmit a message for reporting access availability/unavailability to the UPF.

A PMF protocol message exchanged between the UE and the UPF may use a QoS flow related to a default QoS rule for available access(s).

The QoS flow related to the basic QoS rule for the MA PDU session may be a non-GBR QoS flow.

For PMF protocol messages, UE does not apply ATSSS rules, and UPF does not apply Multimedia-Authentication-Request (MAR) rules.

The UE requests an MA PDU session, the UE may indicate that the UE can support the MPTCP function in all steering modes and support the ATSSS-LL function only in the Active-Standby steering mode. In this case, in order for the UE to transmit an access availability/unavailability report to the UPF, the network may transmit Measurement Assistance Information for the UE to the UE. In this case, since the UE and UPF can use the measurements available in the MPTCP layer, the UE and the UPF do not perform RTT measurements using PMF.

In ATSSS, the Steering function may be supported. Hereinafter, the Steering function will be described.

The functionality of ATSSS-capable UE (ATSSS-capable UE) that ATSSS-capable UE (ATSSS-capable UE) can steer (coordinate), switch, and split the traffic of the MA PDU session through 3GPP access and non-3GPP access can be referred to as "steering functionality". An ATSSS capable UE may support one or more of the following types of steering functions:

1) A high-layer steering function that operates above the Internet Protocol (IP) layer may be supported. For example, a high-layer steering function "MPTCP functionality" applying a Multipath Transmission Control Protocol (MPTCP) protocol may be supported. Here, this steering function ("MPTCP functionality") can be applied to steer, switch, and split TCP traffic of applications that are allowed to use MPTCP. The MPTCP function of the UE may communicate with the associated MPTCP Proxy function of the UPF via the 3GPP user plane and/or the non-3GPP user plane.

2) A low-layer steering function that operates below the IP layer may be supported. For example, a low-layer steering function called "ATSSS Low-Layer functionality" or ATSSS-LL functionality may be supported. Here, this steering function ("ATSSS Low-Layer functionality" or ATSSS-LL functionality) can be applied to steer, switch, and split any type of traffic (including TCP traffic, User Datagram Protocol (UDP) traffic, Ethernet traffic, etc.). ATSSS-LL functionality must be suppurted in an Ethernet-type MA PDU session. In the network, one UPF supporting ATSSS-LL must exist in the data path of the MA PDU session.

The UE may indicate to the network the steering function and steering mode supported by the UE by including one of the following in the UE ATSSS Capability:

1) ATSSS-LL functionality with any steering mode. In this case, the UE may indicate that it can steer, switch and split all traffic of the MA PDU session using the ATSSS-LL function with all steering modes.
2) MPTCP functionality with any steering mode and ATSSS-LL functionality with only Active-Standby steering mode. In this case, ATSSS-LL function with only MPTCP function and Active-Standby steering mode with all steering modes can be supported. In this case, the UE may indicate:

2-a) The UE may use the MPTCP function with all steering modes to steer, switch and split the MPTCP traffic of the MA PDU session.
2-b) The UE may use the ATSSS-LL function with active-standby steering mode to steer, switch and split all other traffic (e.g., non-MPTCP traffic) of the MA PDU session.
3) MPTCP functionality with any steering mode and ATSSS-LL functionality with any steering mode. In this case, the MPTCP function with all steering modes and the ATSSS-LL function with all steering modes may be supported. In this case, the UE may indicate:
3-a) The UE may use the MPTCP function with all steering modes to steer, switch and split the MPTCP traffic of the MA PDU session.
3-b) The UE can use the ATSSS-LL function with any steering mode to steer, switch and split all other traffic (i.e. non-MPTCP traffic) in the MA PDU session.

The steering function described above is schematically illustrated in FIG. 9, which shows an exemplary model for an ATSSS-capable UE supporting the MPTCP function and the ATSSS-LL function.

Figure 9:
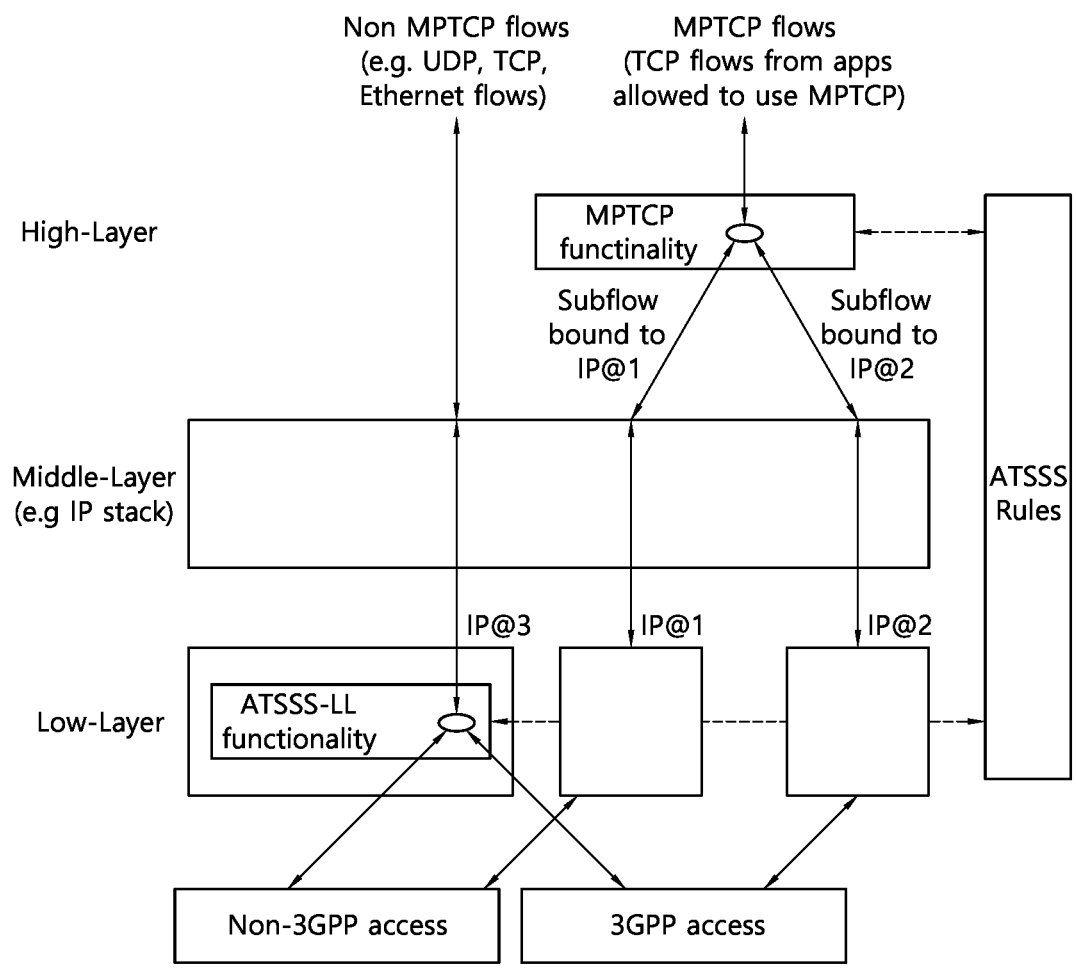
FIG. 9 is a diagram illustrating an example of a steering function of a UE.

FIG. 9 is a diagram illustrating an example of a steering function of a UE.

In the example of FIG. 9, MPTCP flow may indicate traffic of an application to which MPTCP can be applied. In the figure, three different IP addresses (e.g., IP@ 1, IP@2, IP@3) are shown in the UE.

The "Low-Layer" in this figure may contain functions operating below the IP layer (e.g., other network interfaces of the UE), and the "High-Layer" may contain functions operating above the IP layer.

Within the same MA PDU session of the UE, the MPTCP function may be used to steer the MPTCP flow, and at the same time, the ATSSS-LL function may be used to steer all other flows. For the same packet flow, one steering function can be used.

All steering functions of the UE may use the same set of ATSSS rules to perform ATSSS decisions (e.g., how to steer, switch, split traffic). Similarly, all ATSSS decisions in UPF can be performed by applying the same set of N4 rules supporting ATSSS. The ATSSS rule and the N4 rule supporting ATSSS may be provided to each of the UE and the UPF when the MA PDU session is established.

When the UE supports both MPTCP functionality and ATSSS-LL functionality, the UE may determine a steering function to be applied to a specific packet flow by using the provided ATSSS rule.

Hereinafter, the ATSSS rule will be described in detail.

After the MA PDU session is established, the UE may receive a priority list of ATSSS rules from the SMF. An example of the structure of the ATSSS rule is shown in Table 3 below.

TABLE 3

| Information name | Description | Category | SMF permitted to modify in a PDU context | Scope |
| --- | --- | --- | --- | --- |
| Rule Precedence | Determines the order in which the ATSSS rule is evaluated in the UE | Mandatory (NOTE 1) | Yes | PDU context |
| Traffic Descriptor | This part defines the traffic descriptor component of the ATSSS rule. | Mandatory (NOTE 2) | | |

TABLE 3-continued

| Information name | Description | Category | SMF permitted to modify in a PDU context | Scope |
|---|---|---|---|---|
| Application descriptors | Includes one or more application IDs that identify the application generating the traffic (NOTE 3). | Optional | Yes | PDU context |
| IP descriptors (NOTE 4) | One or more 5-tuples that identify the destination of IP traffic. | Optional | Yes | PDU context |
| Non-IP descriptors (NOTE 4) | Includes one or more descriptors to identify the destination of non-IP traffic, such as Ethernet traffic. | Optional | Yes | PDU context |
| Access Selection Descriptor | This part defines the Access Selection Descriptor components for the ATSSS rule. | Mandatory | | |
| Steering Mode | Identifies the steering mode that may be applied for the matching traffic. | Mandatory | Yes | PDU context |
| Steering Functionality | Identifies whether the MPTCP functionality or the ATSSS-LL functionality should be applied for the matching traffic. | Optional (NOTE 5) | Yes | PDU context |

In Table 3 above, NOTE1 to NOTE5 are as follows:
NOTE 1:
Each ATSSS rule may have a different precedence value from the other ATSSS rules.
NOTE 2:
There may be more than one traffic descriptor component.
NOTE 3:
Application ID may include OSId(Operating System Id) and an OSAppId(Operating System Application Id).
NOTE 4:
An ATSSS rule cannot contain both IP descriptors and Non-IP descriptors.
NOTE 5:
If the UE supports only one Steering Functionality, this component is omitted.

The UE may evaluate the ATSSS rules according to priority order.

Each ATSSS rule may include a traffic descriptor (e.g., including one or more components described in the example in Table 3) that may determine when the rule is applicable. When all components of the traffic descriptor match the considered service data flow (SDF), the ATSSS rule may be determined to be applicable.

Depending on the type of MA PDU session, the traffic descriptor may include components such as the following examples:
  When the type of the MA PDU session is IPv4, IPv6, or IPv4v6 type: The traffic descriptor may include an application descriptor and/or an IP descriptor.
  When the type of MA PDU session is Ethernet type: The traffic descriptor may include an application descriptor and/or a non-IP descriptor.

One ATSSS rule may be provided to the UE with a "match all" traffic descriptor that matches all SDFs. If this ATSSS rule is provided, this ATSSS rule may have the lowest Rule Precedence value. This ATSSS rule may be evaluated last by the UE.

Each ATSSS rule may include an access selection descriptor that includes components such as the following examples:
  ATSSS rules may include Steering Mode. Steering Mode may determine how the matched SDF should be distributed over 3GPP access and non-3GPP access. Steering Modes such as the following examples may be supported:
  1) Active-Standby: Active-Standby can be used to steer the SDF in one access (Active access) (if this access is available). And, when active access is unavailable, Active-Standby can be used to switch the SDF to another available access (Standby access). When active access becomes available again, the SDF can be switched back to active access. If standby access is not defined, SDF is allowed only for active access and cannot be transmitted to other accesses.
  2) Smallest Delay: Smallest Delay can be used to steer the SDF to the access determined to have the smallest Round-Trip Time (RTT). Measurements may be performed by the UE and UPF to determine RTT over 3GPP access and non-3GPP access. Also, if one access becomes unavailable, SDF traffic can be switched to another available access, if allowed by PCC rules.
  3) Load-Balancing: Load-Balancing can be used to split the SDF through both accesses when both accesses are available. Load-Balancing may include a percentage of SDF traffic transmitted through 3GPP access and non-3GPP access. Load-balancing can only be applied to non-GBR (Guaranteed Bit Rate) QoS flows. Also, if one access becomes unavailable, all SDF traffic may be switched to another available access, as if the percentage of SDF traffic over the other available access is 100%.
  4) Priority-based: Priority-based can be used to steer the traffic of SDF with high priority access. Priority-based can be used to steer the traffic of the SDF to high priority access until it is determined that the high priority access is congested. When it is determined that the high-priority access is congested, the traffic of the SDF may be transmitted even with the low-priority access. That is, SDF traffic may be split through two accesses. Also, if high priority access becomes unavailable, all SDF traffic may be switched through low priority access. How the UE and the UPF determine when congestion occurs in access may vary by implementation.

ATSSS rules may include Steering Functionality. Steering Functionality can be used to identify whether the MPTCP function or the ATSSS-LL function can be used to steer the traffic of the matching SDF. Steering Functionality can be used when the UE supports multiple functions for ATSSS.

Note that it is not necessary to update the ATSSS rules when one access becomes available or becomes unavailable.

An example of an ATSSS rule that may be provided to a UE is described as follows:

a) ATSSS rules may include "Traffic Descriptor: UDP, DestAddr 1.2.3.4" and "Steering Mode: Active-Standby, Active=3GPP, Standby=non-3GPP":

This ATSSS rule may mean "steers UDP traffic having a destination IP address 1.2.3.4 to active access (3GPP access) when active access (3GPP access) is available. If active access is unavailable, use standby access (non-3GPP access)".

b) ATSSS rules may include "Traffic Descriptor: TCP, DestPort 8080", and "Steering Mode: Smallest Delay":

This ATSSS rule may mean "steer TCP traffic with destination port 8080 to the access with the least delay". The UE may measure the RTT over both accesses to determine the access with the least delay.

c) ATSSS rules may include "Traffic Descriptor: Application-1" Steering Mode: Load-Balancing, 3GPP=20%, non-3GPP=80%", and "Steering Functionality: MPTCP":

This ATSSS rule may mean "Using the MPTCP function, transmit 20% of application-1's traffic over 3GPP access, and transmit 80% of application-1's traffic over non-3GPP access".

II. Techniques and Procedures Related to the Disclosure of the Present Specification Techniques and procedures related to the disclosure herein are described below. In addition, examples of problems to be solved in the disclosure of the present specification may also be described below.

For ATSSS, various steering modes (e.g. Active-Standby, Smallest Delay, Load-Balancing, Priority-based, etc.) have been defined. In addition to the Steering Mode previously defined for ATSSS, in addition, the issue of which steering mode can be supported is discussed as follows.

An example of an issue related to the additional steering mode is as follows.

It is necessary to discuss whether to support additional steering modes and how to support additional steering modes. For issues related to additional steering modes, the following examples can be discussed:

identify gaps with steering modes;

identify whether and how new steering mode(s) can improve the network service delivered to UE and 5G RG, and determine if additional steering mode(s) can be defined whether and how to negotiate the support of additional steering mode(s) between the UE and the network and potentially between NF (e.g. between SMF and UPF);

whether and how to enhance PCC rules, ATSSS rules and N4 rules to support these additional steering mode(s);

whether and how to enhance PMF to support these additional steering mode(s), and what the impact to the UE and the network would be.

Regarding the Steering Mode, the following example was discussed about how to add a location attribute.

Access selection using four conventionally defined steering modes can be used for offloading-related use cases, performance improvement-related use cases, and resiliency/redundancy-related use cases.

In general, the core network determines the ATSSS rules and the UE may follow the ATSSS rules. The ATSSS rules can be dynamically adjusted according to PCF decisions, if the ATSSS rules are adjusted, the updated ATSSS rules may be transmitted to the UE within the lifetime of the corresponding PDU session.

This type of "reactive" may not scale so we like to introduce a "pro-active" way of activating/deactivating ATSSS rules in the UE by introducing "location" as an attribute in the ATSSS rules in the UE. There are certainly other use cases with this type of enhancement.

During network deployment planning phase, there may be areas in which the ATSSS rule is applied differently. For example, an area where new WiFi AP are being replaced/upgraded and operator would like UE to disable ATSSS behaviour in these areas for maintenance reasons. Using R16 method, core network would have to dynamically update the ATSSS rules to each UE that is entering to the area (e.g., when PCF gets a trigger that UE has entered to certain TAI) to update the ATSSS policy. This type of "reactive" may not scale so we like to introduce a "pro-active" way of activating/deactivating ATSSS rules in the UE by introducing "location" as an attribute in the ATSSS rules in the UE.

Hereinafter, specific examples of location attributes added to the ATSSS rule will be described.

Location Criteria is added to ATSSS rule. The UE may use the location criteria as a validation criteria to enable/disable Access selection for the matching traffic.

A procedure for delivering the ATSSS rule to the UE may be performed in the same manner as the procedure defined in the prior art. "UE location" (e.g., the same principle as location criteria for URSP) may be used to determine whether ATSSS rules should be activated. This (e.g. the location attribute added to the ATSSS rule), for example, may be used when an operator wants to disable access steering from 3GPP to N3GPP (Non-3GPP) only in a specific region due to long network maintenance (e.g., days) plan.

In the example of Table 4 below, an example of a location attribute added to the ATSSS rule will be described.

TABLE 4

| Information name | Description | Category | SMF permitted to modify in a PDU context | cope |
|---|---|---|---|---|
| Rule Precedence | Determines the order in which the ATSSS rule is evaluated in the UE | Mandatory (NOTE 1) | Yes | PDU context |

TABLE 4-continued

| Information name | Description | Category | SMF permitted to modify in a PDU context | cope |
|---|---|---|---|---|
| Traffic Descriptor | This part defines the Traffic descriptor components for the ATSSS rule. | Mandatory (NOTE 2) | | |
| Application descriptors | One or more application identities that identify the application(s) generating the traffic (NOTE 3). | Optional | Yes | PDU context |
| IP descriptors (NOTE 4) | One or more 5-tuples that identify the destination of IP traffic. | Optional | Yes | PDU context |
| Non-IP descriptors (NOTE 4) | One or more descriptors that identify the destination of non-IP traffic, i.e. of Ethernet traffic | Optional | Yes | PDU context |
| Access Selection Descriptor | This part defines the Access Selection Descriptor components for the ATSSS rule. | Mandatory | | |
| Steering Mode | Identifies the steering mode that should be applied for the matching traffic. | Mandatory | Yes | PDU context |
| Steering Functionality | Identifies whether the MPTCP functionality or the ATSSS-LL functionality should be applied for the matching traffic. | Optional (NOTE 5) | Yes | PDU context |
| Access Selection Validation Criteria | This part defines the Access Selection Validation Criteria components | Optional | | PDU context |
| Location Criteria | UE location where the Access Selection is considered applicable for the matching traffic. | Optional | Yes | PDU context |

In Table 4, NOTE1 to NOTE5 are the same as those described in the example of Table 3.

It can be seen that the ATSSS rules of Table 4 have been added to the ATSSS rules of Table 3 with Access Selection Validation Criteria and Location Criteria.

By adding the Location Attribute to the ATSSS rules (e.g., adding the Access Selection Validation Criteria and Location Criteria as shown in the example in Table 4), the following impacts may occur:

SMF: The SMF transmits the ATSSS rule including the Location Criteria attribute to the UE, the SMF may support transmission of an ATSSS rule including a Location Criteria attribute to UPF through N4.

PCF: The PCF may support Location Criteria attribute of ATSSS control information for SMF.

UPF: Supports new N4 ATSSS rule with Location Criteria attribute.

UE: A new steering mode with Location Criteria attribute can be supported.

5G-AN/NG RAN: No impact.

On the other hand, the contents discussed in the prior art as above have the following problems.

Specifically, in the above, a method of adding validity criteria (e.g., Access Selection Validation Criteria and Location Criteria in the example of Table 4) to the conventionally defined ATSSS rule was proposed. However, if there is no ATSSS rule that satisfies the validity criteria, it is not clear how the UE performs traffic control. Also, it is not clear how the UPF can perform downlink traffic control by considering the validity criteria (e.g. validity criteria of the N4 rule).

In other words, when there is no valid ATSSS rule in the UE, how to handle traffic, whether the UPF will apply validation criteria (e.g. validation criteria of N4 rule) and how the UPF applies validity criteria (e.g. the validity criteria of the N4 rule) are not clearly defined.

The network may transmit a default ATSSS rule with a match all filter to the terminal while giving the ATSSS rule to the terminal. Here, the default ATSSS rule with match all filter may mean an ATSSS rule for processing traffic not matched by another ATSSS rule. For example, a terminal may have a plurality of ATSSS rules and a default ATSSS rule. In this case, a default ATSSS rule may be used to process traffic that is not matched by a plurality of ATSSS rules among traffic of the UE. However, since this default ATSSS rule (e.g. default ATSSS rule with match all filter) is optional, the network may selectively transmit a default ATSSS rule with a match all filter to the UE.

If there is no ATSSS rule matched in the terminal, the terminal can freely select access to send traffic according to implementation/user preference, etc. However, if validity criteria are defined for the ATSSS rule, when there is no default ATSSS rule, and when all ATSSS rules are invalid, the terminal does not know how to transmit traffic. In addition, when the valid ATSSS rule suddenly disappears according to the validity criteria while the terminal is transmitting traffic, there may be a problem that the terminal fails to transmit traffic and drops traffic.

Therefore, a method to solve these problems is required.

III. Disclosure of the Present Specification

Disclosures described later in this specification may be implemented in one or more combinations (e.g., a combination including at least one of the contents described below). Each of the drawings represents an embodiment of each disclosure, but the embodiments of the drawings may be implemented in combination with each other.

Description of the method proposed in the disclosure of this specification may be composed of a combination of one or more operations/configurations/steps described below. The following methods described below may be performed or used in combination or complementary.

In the disclosure of the present specification, an example of a method for efficiently controlling traffic by utilizing the ATSSS rule will be described. For example, an example of a method for supporting a validity criterion for controlling a traffic transmission path will be described. For example, the disclosure of the present specification describes various examples for supporting validity criteria of access traffic steering rules.

In the procedures described in various examples of the disclosure herein below, certain actions/steps may be performed concurrently/parallel, or may be performed in an order different from the order described in the disclosure herein.

Hereinafter, the disclosure of the present specification will be described with reference to the first to fifth examples of the disclosure of the present specification. The first to fifth examples of the disclosure of the present specification described below may be implemented in combination.

1. First Example of the Disclosure of the Present Specification

The first example of the disclosure of this specification describes an example of a method for a terminal to request an update for an ATSSS rule from a network. For example, the first example of the disclosure of the present specification describes an example of a method of requesting an ATSSS rule update from a network when a terminal does not have a valid ATSSS rule.

The terminal may perform an operation of requesting an update of the ATSSS rule from the SMF using the PDU Session Modification procedure. At this time, the terminal can create an ATSSS rule it wants and transmit it to the SMF, or the terminal can add an indication that there is no valid ATSSS rule and transmit it to the SMF. Alternatively, the terminal may transmit to the SMF an indication that the ATSSS rule desired by the terminal and the valid ATSSS rule are not present.

Upon receiving this, the SMF can notify the PCF of the UE's request, and based on this, the SMF can receive an updated PCC rule from the PCF. The SMF may generate an updated ATSSS rule based on the updated PCC rule. Alternatively, the SMF may generate an ATSSS rule directly updated by the SMF according to a current PCC rule or a PCC rule preconfigured in the SMF without interaction with the PCF.

Thereafter, the SMF may transmit an updated ATSSS rule to the UE using the PDU Session Modification procedure. When using this method, the terminal may transmit a request to update the ATSSS rule to the network even if there is a valid ATSSS rule. For reference, in the prior art, the terminal cannot perform a request to update the ATSSS rule.

For example, the terminal can recognize that there is no ATSSS rule that satisfies the validity condition by a specific condition (e.g. the location of the terminal, the current time, etc.). In this case, the terminal transmits a PDU session modification request message to the AMF, to AMF may transmit the PDU session modification request message transmitted by the UE to the SMF. Here, the PDU session modification request message may include an indication indicating that there is no valid ATSSS rule. Alternatively, the PDU session modification request message may include information about an ATSSS rule created by the terminal.

For reference, in various examples of the disclosure of the present specification, validity condition may be used as a term with the same meaning as Validity Criteria.

2. Second Example of the Disclosure of the Present Specification

A second example of the disclosure of the present specification describes an example of a method in which a network provides a default ATSSS rule to a terminal. For example, in the second example of the disclosure of the present specification, an example of a method in which the network necessarily transmits the default ATSSS rule including the Match All filter to the terminal, when the network puts validity criteria into the ATSSS rule, will be described.

When the SMF transmits the ATSSS rule to the UE, if all ATSSS rules (e.g., all ATSSS rules transmitted by the SMF to the UE) include validity criteria, the SMF may additionally transmit a default ATSSS rule including a Match All filter to the UE.

At this time, the default ATSSS rule must not include validity criteria. Through this, even if all other ATSSS rules are invalid, it is possible to guarantee that at least one ATSSS rule is valid. For example, the SMF may provide the terminal with a plurality of ATSSS rules including validity criteria and a default ATSSS rule (validity criteria not included) including Match All filters. Even if all ATSSS rules including validity criteria are invalid, since the terminal has a default ATSSS rule (validity criteria are not included) that includes the Match All filter, the terminal can use the default ATSSS rule including the Match All filter as a valid ATSSS rule.

If the PCF creates a PCC rule containing validity conditions, the PCF may always create PCC rules to create ATSSS rule/N4 rules that include match all filters. If there is a PCC rule to create an ATSSS rule/N4 rule that includes match all filters among PCC rules, the SMF can create an ATSSS rule/N4 rule by inserting a match all filter into the ATSSS rule. The SMF may provide the ATSSS rule including the match all filter to the UE and provide the N4 rule including the match all filter to the UPF. For example, the SMF may generate a default ATSSS rule as described in the second example of the disclosure of this specification.

According to the second example of the disclosure of the present specification, unlike the prior art, the terminal cannot perform an operation of freely selecting and transmitting access. That is, if there is no matching ATSSS rule, unlike the prior art in which the terminal freely selects access to transmit traffic, the terminal uses the default ATSSS rule. However, according to the second example of the disclosure of the present specification, there is an advantage in that the problem can be solved in a state in which signaling between the terminal and the network is not changed in the conventional procedure.

3. Third Example of the Disclosure of the Present Specification

A third example of the disclosure of the present specification describes an example of a method in which a terminal freely selects and transmits access. For example, in the third example of the disclosure of the present specification, when the terminal does not have a valid ATSSS rule, an example of a method in which the terminal freely selects and transmits access will be described.

If there is no valid ATSSS rule for the terminal, the terminal may randomly select access and transmit traffic. In this case, as described in the first example of the disclosure of this specification (e.g., the network performs an operation of updating the ATSSS rule), the network does not need to update the ATSSS rule. However, according to the third example of the disclosure of this specification, there is a problem that there is no way for the network to control the terminal when there is no valid ATSSS rule. To solve these problems, while creating MA PDU Session, the SMF may transmit an indication to the terminal indicating whether the terminal can select and transmit access when there is no valid ATSSS rule. In the absence of a valid ATSSS rule, based on these indications, the terminal only transmits when the network allows it (e.g., when the network allows the terminal to select access and transmit), the terminal can freely select an access and transmit traffic.

4. Fourth Example of the Disclosure of the Present Specification

The fourth example of the disclosure of the present specification describes an example of a scheme in which UPF uses validity criteria (e.g., validity criteria of N4 rule). For example, the fourth example of the disclosure of the present specification describes an example of how a UPF satisfies validity criteria.

The UPF may generally operate based on the N4 rule provided by SMF. In general, for validity criteria (e.g., validity criteria of N4 rule), location criteria and time window can be considered. However, the UPF may not have location information or time information of the terminal. Therefore, it is difficult for the UPF to directly check the validity criteria, and the SMF must check the validity criteria and update the N4 rule of the UPF. This is because SFM can know the location information and time information of the terminal. However, in this case, signaling between SMF and UPF may increase.

In order to solve this problem, in the fourth example of the disclosure of the present specification, the UPF can check validity criteria (e.g., N4 rule validity criteria). To this end, the UPF needs to know the location of the UE, but the UPF cannot know the exact location of the UE and can only know information about the base station to which the UE is currently connected. Therefore, the UPF can check the location of the terminal with TA (Tracking Area) granularity.

Alternatively, the terminal may provide information for checking validity criteria to the UPF using the PMF protocol (PMFP). That is, according to the PMFP configuration of the UPF, the terminal may periodically inform the UPF of the location of the terminal through the PMF measurement report or inform the UPF of time information. In this case, the UPF can know the location and current time of the UE without control plane signaling. In particular, when the terminal is roaming, it is difficult for UPF to know the time information of the terminal. If the UPF uses the PMFP, accurate time information of the terminal can be obtained.

5. Fifth Example of the Disclosure of the Present Specification

A fifth example of the disclosure of this specification describes an example of a method for exchanging capabilities between a terminal and a network.

The terminal and the network may exchange each other's capabilities to inform that they support the validity criteria of the ATSSS rule. The terminal and the network can exchange capabilities by defining and exchanging new capabilities in the conventional 5GSM Capability, or by exchanging through ATSSS-ST IE, or by defining a new IE in ATSSS Container (e.g. Support of Validity Criteria or UE requested ATSSS rule update capability, etc.). When the terminal creates (or establishes) a PDU Session, it transmits capability information of the UE to the SMF, and the SMF may also deliver it to the PCF. Only when the terminal supports the Validity Criteria, the SMF/PCF can transmit with the Validity Criteria included. For example, only when the terminal receives capability information that supports the validity criteria of the ATSSS rule, the SMF/PCF may provide ATSSS rules including Validity Criteria to the terminal.

For example, the terminal may transmit a PDU Session Establishment Request message. For example, the terminal may transmit a PDU Session Establishment Request to create (or establish) an MA PDU Session. The terminal may transmit the PDU Session Establishment Request message by setting the Request Type of the UL NAS Transport message (message for transmitting the PDU Session Establishment Request) to "MA PDU request". Here, the Request Type set to "MA PDU request" may inform that it is a request for establishing an MA PDU Session. In addition, the terminal may transmit the PDU Session Establishment Request message by including ATSSS capability information in the PDU Session Establishment Request message. At this time, if the terminal supports the validity condition for the ATSSS rule, the terminal may also transmit capability information indicating that it supports the validity condition (or validity criteria). For example, the ATSSS capability information may include capability information indicating that the UE supports validity conditions (or validity criteria). The SMF may transmit the ATSSS capability information transmitted by the UE to the PCF. When the PCF generates a PCC rule based on the ATSSS capability information of the terminal, the PCF may generate the PCC rule including validity condition can be created in MA PDU Session Control information.

Alternatively, the network can always transmit with a Validity Criteria regardless of whether the terminal supports it. For example, the network may always transmit an ATSSS rule including Validity Criteria regardless of whether the terminal supports it. In this case, if the terminal does not support Validity Criteria, the terminal ignores the ATSSS rule including the corresponding IE, or the terminal may ignore the Validity Criteria and determine that the ATSSS rule is always valid.

For reference, only when the terminal confirms from the network that the network supports the Validity Criteria, the terminal may perform various operations described in the first to fifth examples of the disclosure of this specification. For example, only if the network supports Validity Criteria, the terminal may perform an operation of requesting an ATSSS rule by using the operation described in the first example of the disclosure of the present specification.

6. Sixth Example of the Disclosure of the Present Specification

The sixth example of the disclosure of the present specification describes an example of an operation combining at least one or more of the first example, the second example, the fourth example, and the fifth example of the disclosure of the present specification described above.

The following drawings are made to explain a specific example of the present specification. Since the names of specific devices or names of specific signals/messages/fields described in the drawings are provided as examples, the technical features of the present specification are not limited to the specific names used in the drawings below.

Figure 10A:
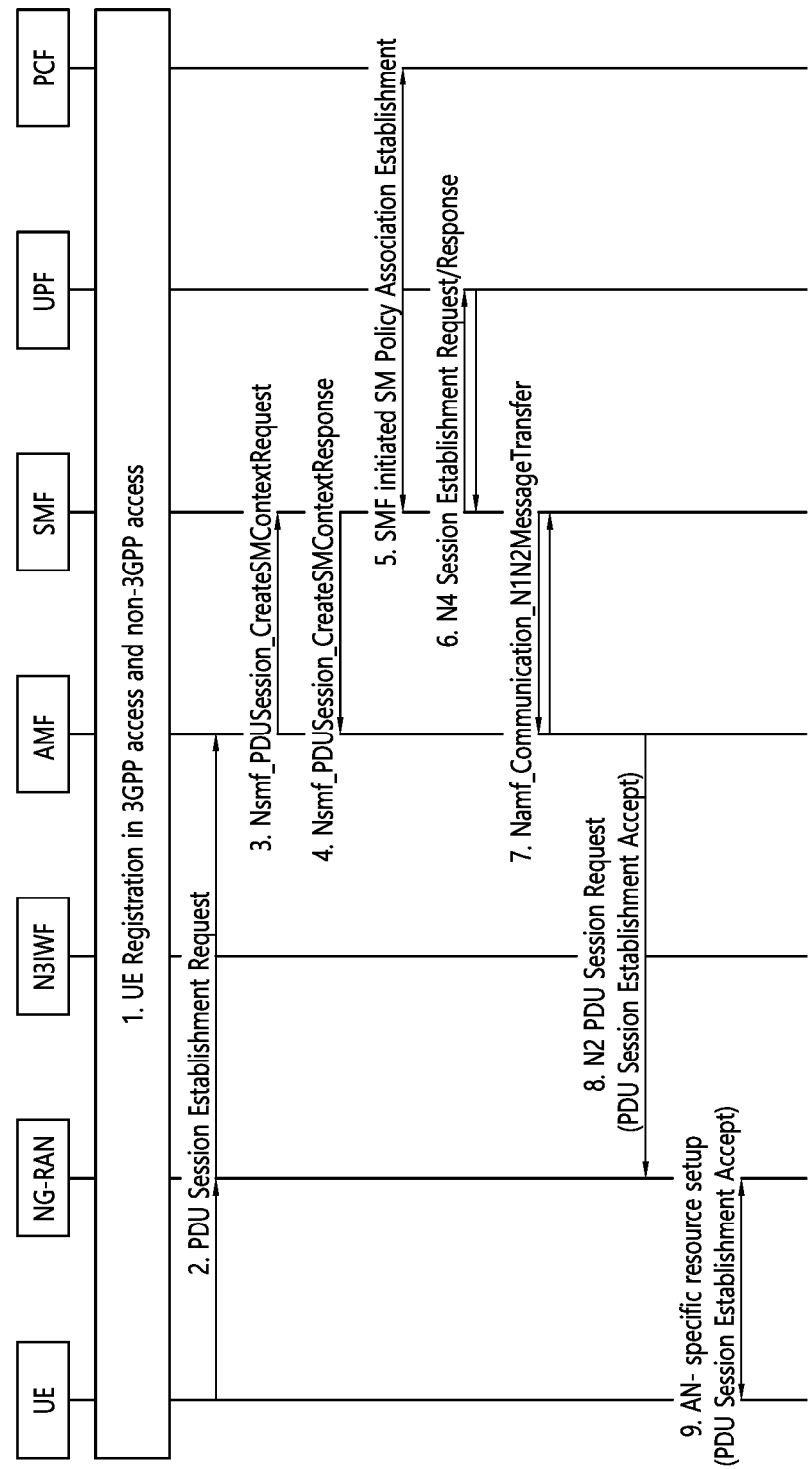
FIGS. 10*a* to 10*c* show signal flow charts according to a sixth example of the disclosure of the present specification.
Figure 10B:
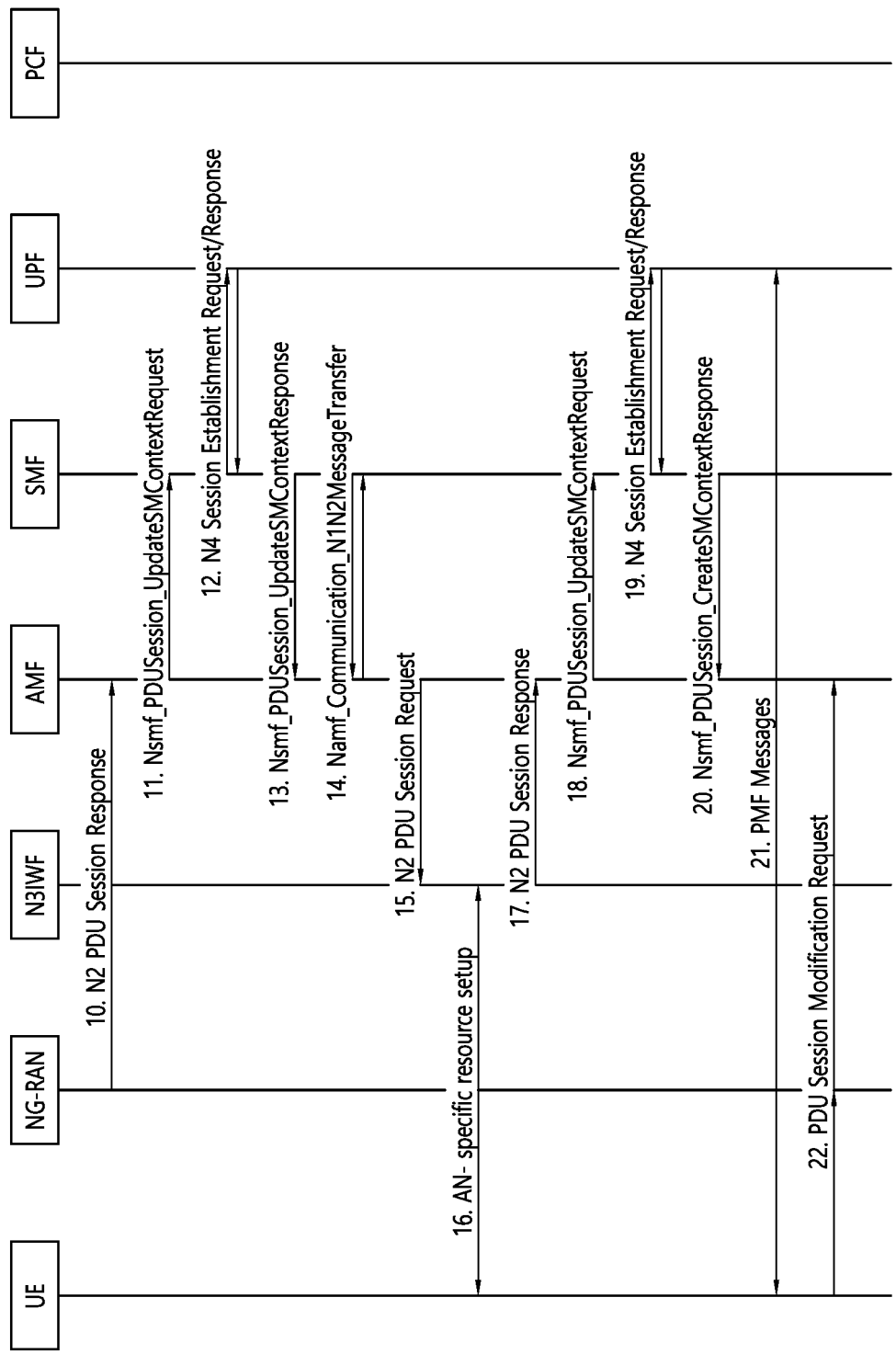
Figure 10C:
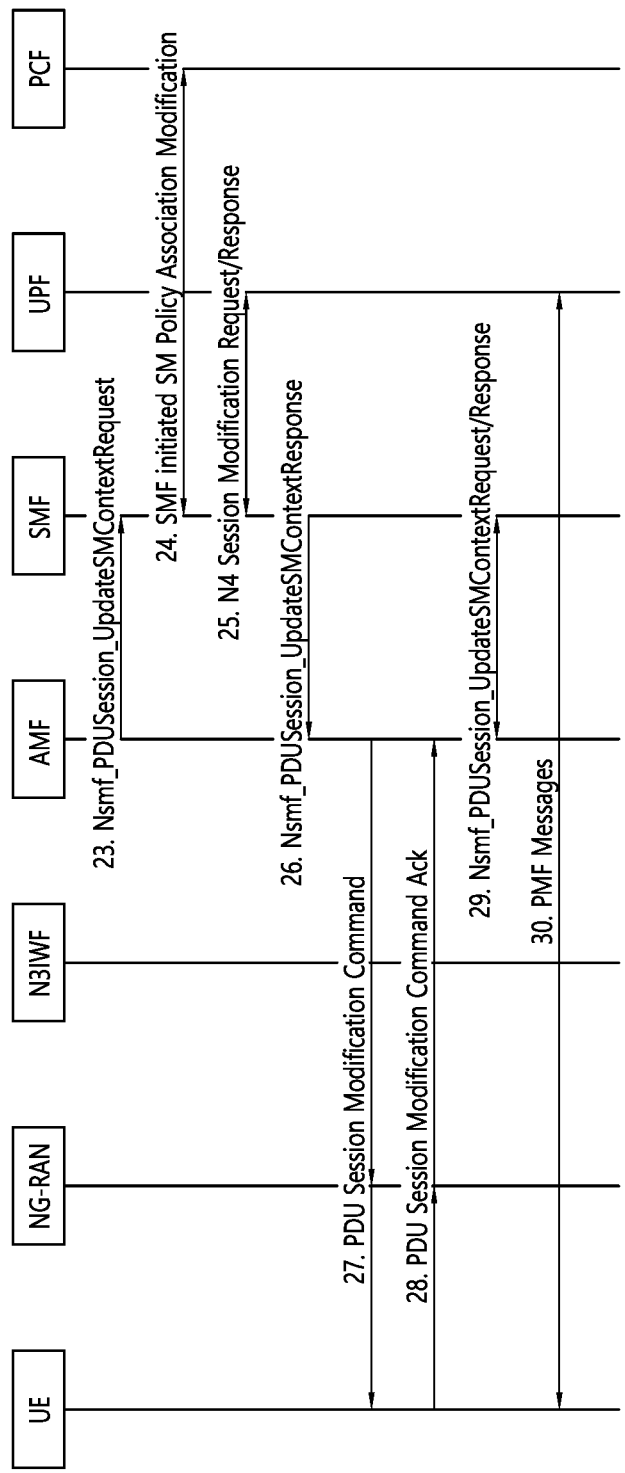

FIGS. 10a to 10c show signal flow charts according to a sixth example of the disclosure of the present specification.

1) It is assumed that the terminal is registered in the network through 3GPP access and non-3GPP access.

2) The terminal may transmit a PDU Session Establishment Request message. For example, the terminal may transmit a PDU Session Establishment Request to create (or establish) an MA PDU Session. The terminal may transmit the PDU Session Establishment Request message by setting the Request Type of the UL NAS Transport message (message for transmitting the PDU Session Establishment Request) to "MA PDU request". Here, the Request Type set to "MA PDU request" may inform that it is a request for establishing an MA PDU Session. In addition, the terminal may transmit the PDU Session Establishment Request message by including ATSSS capability information in the PDU Session Establishment Request message. At this time, if the terminal supports the validity condition for the ATSSS rule, the terminal may also transmit capability information indicating that it supports the validity condition (or validity criteria). For example, the ATSSS capability information may include capability information indicating that the UE supports validity conditions (or validity criteria).

3-4) The AMF may transmit the PDU Session Establishment Request message transmitted by the terminal to the SMF.

5) The SMF may transmit the ATSSS capability information transmitted by the terminal to the PCF. The PCF may generate a PCC rule including a validity condition in MA PDU Session Control information while generating a PCC rule based on the ATSSS capability information of the terminal. In other words, the PCC rule generated by PCF includes MA PDU Session Control information, the MA PDU Session Control information may include validity conditions. The PCF can transmit the generated PCC rule to the SMF. At this time, when the contents described in the second example of the disclosure of this specification are used, if the PCF creates a PCC rule that contains a validity condition, the PCF must create a PCC rule to create an ATSSS rule/N4 rule that contains match all filters.

6) Based on the PCC rule received from the PCF (or based on the information configured in the SMF if the PCF is not used), the SMF may generate an ATSSS rule to be transmitted to the UE and an N4 rule to be transmitted to the UPF. At this time, since the terminal supports the validity condition, the ATSSS rule and the N4 rule may contain validity conditions for ATSSS. The SMF may transmit the generated N4 rule to UPF. If there is a PCC rule to create an ATSSS rule/N4 rule that includes match all filters among PCC rules, the SMF can create an ATSSS rule/N4 rule by inserting a match all filter into the ATSSS rule. For example, the SMF may generate a default ATSSS rule as described in the second example of the disclosure of this specification.

7) While accepting the MA PDU Session, the SMF may transmit the generated ATSSS rule to the UE by including it in the PDU Session Establishment Accept message. In addition, the SMF may also transmit an N2 message for allocating resources for an MA PDU session in 3GPP access to the UE.

8) The AMF may transmit the N2 message and PDU Session Establishment Accept message transmitted by SMF to NG-RAN.

9) The NG-RAN performs a process of allocating resources necessary for the MA PDU Session while exchanging AN signaling with the terminal, and may transmit a PDU Session Establishment Accept message to the terminal.

10) The NG-RAN may inform the SMF of the successful allocation of 3GPP access resources via the AMF.

11) The AMF may deliver the message transmitted by the NG-RAN to the SMF.

12) The SMF may perform UPF and N4 Session Modification procedures to update tunnel information transmitted by NG-RAN.

13) The SMF may transmit a response to step 11 to the AMF.

14) The SMF may transmit an N2 message to AMF for allocating resources for MA PDU Session in non-3GPP access.

15) The AMF may transmit the N2 message received from the SMF to the N3IWF.

16) The N3IWF may perform a process of allocating resources necessary for the MA PDU Session while exchanging AN signaling with the UE.

17) The N3IWF may inform the SMF that the non-3GPP access resource has been successfully allocated via the AMF.

18) The AMF may deliver the message transmitted by NG-RAN to the SMF.

19) The SMF can perform N4 Session Modification procedures with the UPF to update the tunnel information transmitted by the N3IWF.

20) The SMF may transmit a response to step 18 to the AMF.

21) The UPF can check whether the validity condition needs to be checked based on the N4 rule received from the SMF. When it is necessary to check the validity condition, the UPF may request information necessary to check the validity condition from the terminal using the PMF message. For example, the UPF may request location or time information of the terminal from the terminal. Upon receiving this, the terminal may transmit information required to check the validity condition of the N4 rule to the UPF according to the UPF request.

For this purpose, the UPF may request the terminal to transmit information according to specific conditions. For example, the UPF causes the terminal to inform the UPF when certain conditions (when a specific time arrives, when the terminal enters or leaves a specific place) are met, the UPF may request the terminal to periodically transmit location or time information of the terminal to the UPF. The UPF may check the validity condition of the N4 rule based on the information transmitted by the terminal.

22) The terminal may recognize that there is no ATSSS rule that satisfies the validity condition under certain conditions (e.g. location of the terminal, current time, etc.) while receiving service through the MA PDU Session. In this case, the terminal may transmit the PDU Session Modification Request message by adding an indication indicating that there is no valid ATSSS rule to the PDU Session Modification Request message. In addition, in order to include information on traffic to be transmitted, the terminal informs traffic by including packet filter-type information in the PDU Session Modification Request message, or the terminal may include ATSSS rule ID information stored in the terminal in the PDU Session Modification Request message. If traffic is informed in the form of a packet filter, the terminal may generate an ATSSS rule desired by the terminal and transmit the generated ATSSS rule by including it in a PDU Session Modification Request message.

23) The AMF may transfer the PDU Session Modification Request message transmitted by the UE to the SMF.

24) The SMF may recognize that there is no valid ATSSS rule through the PDU Session Modification Request message transmitted by the UE. The SMF may receive an updated PCC rule from the PCF by informing the PCF of this (e.g., that there is no valid ATSSS rule). If the terminal includes the ATSSS rule ID or packet filter information, the SMF may inform the PCF of the related information together. The PCF may transmit the updated PCC rule to the SMF. At this time, the PCF may transmit a PCC rule that does not include the validity condition, or may transmit a PCC rule with a new validity condition to the SMF.

25) The SMF may generate an updated N4 rule according to the updated PCC rule and transmit the generated N4 rule to the UPF.

26-29) The SMF may generate an updated ATSSS rule according to the updated PCC rule and transmit the generated ATSSS rule to the terminal. The terminal may transmit traffic according to the updated ATSSS rule.

30) The UPF can check whether the validity condition should be checked based on the updated N4 rule. When it is necessary to check the validity condition of the N4 rule, the UPF can request information necessary to check the validity condition from the terminal using the PMF message. To this end, the UPF may update (add, delete, or change) previously set conditions.

7. Operations According to the Disclosure of the Present Specification

An example of an operation combining at least one or more of the first to sixth examples of the disclosure of the present specification described above will be described.

The following drawings are made to explain a specific example of the present specification. Since the names of specific devices or names of specific signals/messages/fields described in the drawings are provided as examples, the technical features of the present specification are not limited to the specific names used in the drawings below.

Figure 11:
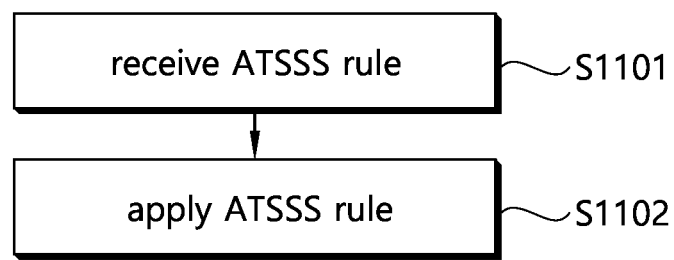
FIG. 11 shows an example of an operation of a UE according to the disclosure of the present specification.

FIG. 11 shows an example of an operation of a UE according to the disclosure of the present specification.

For reference, the operation of the UE shown in the example of FIG. 11 is only an example, and the scope of the disclosure of this specification is not limited by the operation shown in FIG. 11. For example, the UE may perform the operations described in the first to sixth examples of the disclosure of this specification, even if the operation is not shown in FIG. 11.

In step S1101, the UE may receive an ATSSS rule. For example, the UE may receive ATSSS rules from SMF. The UE may receive multiple ATSSS rules from SMF. For example, the UE may receive a first ATSSS rule including validity criterion and a second ATSSS rule including Match All filter.

For reference, before step S1101 is performed, the UE may transmit capability information related to supporting the validity criterion for the ATSSS rule to the SMF.

In step S1102, the UE may apply the ATSSS rule. If the ATSSS rule includes the validity criterion, the UE may check whether the validity criterion of the ATSSS rule is satisfied. If the UE receives multiple ATSSS rules (e.g., the first ATSSS rule and the second ATSSS rule), the UE may apply the first ATSSS rule or the second ATSSS rule based on whether the validity criterion included in the first ATSSS rule is satisfied. If the validity criterion is satisfied, the UE may transmit traffic by applying the first ATSSS rule. If the validity criterion is not satisfied, the UE may transmit traffic by applying the second ATSSS rule. For reference, the ATSSS rule including the validity criterion may be transmitted to the UE by the SMF only when the UE transmits capability information to the SMF.

Among the ATSSS rules received by the UE, there may be no ATSSS rule that satisfies the validity criterion. For example, there may not be a valid ATSSS rule for the UE. In this case, the UE may transmit a request message requesting an ATSSS rule update to the SMF. Then, the SMF may transmit a response message including the updated ATSSS rule to the UE.

The UE may transmit a measurement report message (e.g., PMFP report message) including at least one of time information of the UE and location information of the UE to the UPF. The time information of the terminal and/or the location information of the terminal may be used to check the validity criterion included in the UPF N4 rule. For reference, the UPF may transmit a message requesting the UE to transmit location or time information of the UE.

The following drawings are made to explain a specific example of the present specification. Since the names of specific devices or names of specific signals/messages/fields described in the drawings are provided as examples, the technical features of the present specification are not limited to the specific names used in the drawings below.

FIG. 12 shows an example of an operation of a UE and an operation of a network according to the disclosure of the present specification.

For reference, the operation of the UE and the operation of the network node (e.g., SMF, UPF, PCF, etc.) shown in the example of FIG. 12 are only examples, the scope of the disclosure of the present specification is not limited by the operation shown in FIG. 12. For example, the UE and the network node (e.g., SMF, UPF, PCF, etc.) may perform the operations described in the first to sixth examples of the disclosure of this specification even if the operation is not shown in FIG. 12.

For reference, although the NG-RAN, the N3IWF, and the AMF are not shown in the example of FIG. 12, the NG-RAN, the N3IWF, and the AMF may perform operations described in the examples of FIGS. 10a to 10c.

For reference, in the example of FIG. 12, steps S1201, S1202, S1205, S1206, and S1207 may be selectively performed. For example, at least one of step S1201, step S1202, step S1205, step S1206 or step S1207 may be omitted.

In step S1201, the UE may transmit capability information to the SMF. For example, the capability information may include information that the UE supports the validity criterion for the ATSSS rule.

In step S1202, the SMF may deliver capability information to the PCF. Step S1202 may be omitted. When the SMF delivers capability information to the PCF, the PCF may provide the SMF with an updated PCC rule. The SMF may generate an updated ATSSS rule based on the updated PCC rule. Alternatively, the SMF may generate an ATSSS rule directly updated by the SMF according to a current PCC rule or a PCC rule preconfigured in the SMF without interaction with the PCF. For reference, when the SMF creates the ATSSS rule, it may also create the N4 rule to be provided to the UPF.

In step S1203, the SMF may transmit an ATSSS rule to the UE. The SMF may provide N4 rule to UPF. The SMF may also transmit an ATSSS rule (e.g., default ATSSS rule) including a match all filter to the UE.

In step S1204, the UE may determine whether to apply the ATSSS rule. For example, if the ATSSS rule includes a validity criterion, the UE may check whether the validity criterion is satisfied. If the validity criterion is satisfied, the UE may transmit traffic by applying the ATSSS rule. If the validity criterion of the ATSSS rule is not satisfied, the UE may perform step S1205. Alternatively, the UE may have received an ATSSS rule (e.g., default ATSSS rule) including match all filters in step S1203. In this case, all other ATSSS rules other than the ATSSS rule (e.g. default ATSSS rule) including the match all filter do not satisfy the validity criterion, or if there is only an ATSSS rule that does not match traffic, the UE may apply an ATSSS rule (e.g., default ATSSS rule) including a match all filter.

In step S1205, the UE may transmit a request message for updating the ATSSS rule to the SMF. For example, when the validity criterion of the ATSSS rule is not satisfied, the UE may transmit a request message for updating the ATSSS rule to the SMF.

In step S1206, the SMF may transmit an updated ATSSS rule to the UE.

In step S1207, the UE may transmit a measurement report message to the UPF. The measurement report message may include UE time information and/or UE location information. For example, the measurement report message may be a PMFP report message. For reference, before step S1207 is performed, the UE may receive a message requesting a measurement report message (e.g., a PMFP message) from the UPF. The UE may transmit a measurement report message to the UPF based on receiving this message from the UPF. The UPF may check the validity criterion included in the N4 rule based on UE time information and/or UE location information.

According to the description in the disclosure of this specification with reference to various examples, validity criteria can be efficiently supported in the ATSSS rule. Also, according to the description in the disclosure of the present specification, traffic control using ATSSS rules can be efficiently performed. For example, a validity criterion of a rule for controlling a traffic transmission path may be supported.

According to the disclosure of this specification with reference to various examples, if the terminal does not have a valid ATSSS rule, the terminal may request an update of the ATSSS rule from the network together with an indication indicating that there is no valid ATSSS rule. If the network puts validity criteria into the ATSSS rule, the network can always transmit the default ATSSS rule that does not include the validity criteria and includes the Match All filter to the UE. Based on the indication provided by the network, if there is no valid ATSSS rule, the terminal can freely select access and transmit data. The terminal uses the PMFP to transmit the location information and time information of the terminal to the UPF, the UPF may check the validity criteria in the downlink included in the N4 rule based on the location information and time information of the UE. The terminal and the network exchange capabilities for whether or not the Validity Criteria is supported, only when there is capability, the terminal and the network may perform the operations described in various examples above.

For reference, the operation of the terminal (e.g., UE) described in this specification may be implemented by the apparatus of FIGS. 1 to 4 described above. For example, the terminal (e.g., UE) may be the first device 100 or the second device 200 of FIG. 2. For example, an operation of a terminal (e.g., UE) described herein may be processed by one or more processors 102 or 202. The operation of the terminal described herein may be stored in one or more memories 104 or 204 in the form of an instruction/program (e.g. instruction, executable code) executable by one or more processors 102 or 202. One or more processors 102 or 202 control one or more memories 104 or 204 and one or more transceivers 105 or 206, and may perform the operation of the terminal (e.g., UE) described herein by executing instructions/programs stored in one or more memories 104 or 204.

In addition, instructions for performing an operation of a terminal (e.g., UE) described in the disclosure of the present specification may be stored in a non-volatile computer-readable storage medium in which it is recorded. The storage medium may be included in one or more memories 104 or 204. And, the instructions recorded in the storage medium may be executed by one or more processors 102 or 202 to perform the operation of the terminal (e.g., UE) described in the disclosure of the present specification.

For reference, the operation of a network node (e.g., N3IWF, AMF, SMF, UPF, PCF, DN etc.) or base station (e.g., NG-RAN, gNB, eNB, RAN, E-UTRAN etc.) described herein may be implemented by the apparatus of FIGS. 1 to 3 to be described below. For example, a network node or a base station may be the first device 100 of FIG. 2 or the second device 200 of FIG. 2. For example, the operation of a network node or base station described herein may be processed by one or more processors 102 or 202. The operation of the terminal described herein may be stored in one or more memories 104 or 204 in the form of an instruction/program (e.g. instruction, executable code) executable by one or more processors 102 or 202. One or more processors 102 or 202 may perform the operation of a network node or a base station described herein, by controlling one or more memories 104 or 204 and one or more transceivers 106 or 206 and executing instructions/programs stored in one or more memories 104 or 204.

In addition, instructions for performing the operation of the network node or base station described in the disclosure of this specification may be stored in a non-volatile (or non-transitory) computer-readable storage medium. The storage medium may be included in one or more memories 104 or 204. And, the instructions recorded in the storage medium are executed by one or more processors 102 or 202, so that the operations of a network node or base station are performed.

In the above, preferred embodiments have been exemplarily described, but the disclosure of the present specification is not limited to such specific embodiments, and thus, modifications, changes, or can be improved.

In the exemplary system described above, the methods are described on the basis of a flowchart as a series of steps or blocks, but are not limited to the order of the steps described, some steps may occur in a different order or concurrent with other steps as described above. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method.

What is claimed is:

1. A method comprising:
transmitting capability information to a session management node;
receiving one or more rules related to an access traffic steering from the session management node; and
applying the one or more rules related to the access traffic steering,
wherein the capability information informs that a user equipment supports validity criteria for the access traffic steering,
wherein the one or more rules include a first rule including a validity criterion and a second rule including a Match All filter,
wherein, based on whether the validity criterion included in the first rule is satisfied, the first rule or the second rule is applied, and
wherein, based on the validity criterion included in the first rule not being satisfied, the second rule is applied.

2. The method of claim 1, further comprising:
based on the validity criterion included in the one or more rules not being satisfied, transmitting a request message requesting an update of the one or more rules to the session management node.

3. The method of claim 2, further comprising:
in response to the request message, receiving a response message including an updated rule from the session management node.

4. The method of claim 1, further comprising:
transmitting a Performance measurement function (PMF) protocol (PMFP) report message including at least one of time information of the UE or location information of the UE to a user plane node,
wherein the time information of the UE and/or the location information of the UE is used by the user plane node to check the validity criterion included in the N4 rule.

5. The method of claim 4, further comprising:
receiving a PMFP message requesting the PMFP report message from the user plane node,
wherein the PMFP report message is transmitted to the user plane node, based on the PMFP message being received.

6. The method of claim 1,
wherein the first rule is transmitted by the session management node based on the capability information being transmitted.

7. A user equipment comprising:
at least one transceiver:
at least one processor; and
at least one memory operably connectable to the at least one processor
and storing instructions that, based on being executed by the at least one processor, cause the user equipment perform operations comprising:
transmitting capability information to a session management node;
receiving one or more rules related to an access traffic steering from the session management node; and
applying the one or more rules related to the access traffic steering,
wherein the capability information informs that a user equipment supports validity criteria for the access traffic steering,
wherein the one or more rules include a first rule including a validity criterion and a second rule including a Match All filter,
wherein, based on whether the validity criterion included in the first rule is satisfied, the first rule or the second rule is applied, and
wherein, based on the validity criterion included in the first rule not being satisfied, the second rule is applied.

8. The method user equipment of claim 7,
wherein the UE is in communication with at least one of a mobile terminal, a network, and an autonomous vehicle other than the UE.

9. A method comprising:
receiving capability information from a user equipment; and
transmitting one or more rules related to an access traffic steering to the user equipment,
wherein the capability information informs that the user equipment supports validity criteria for the access traffic steering,
wherein the one or more rules include a first rule including a validity criterion and a second rule including a Match All filter,
wherein, based on whether the validity criterion included in the first rule is satisfied, the first rule or the second rule is applied, and
wherein, based on the validity criterion included in the first rule not being satisfied, the second rule is applied.

10. The method of claim 9, further comprising:
receiving a request message requesting an update of the one or more rules from the user equipment.

11. The method of claim 10, further comprising:
transmitting a response message including an updated rule to the user equipment.

* * * * *